(12) United States Patent
Vrankovic et al.

(10) Patent No.: US 11,387,761 B2
(45) Date of Patent: Jul. 12, 2022

(54) SYSTEM AND METHOD FOR SINUSOIDAL OUTPUT AND INTEGRATED EMC FILTERING IN A MOTOR DRIVE

(71) Applicant: Rockwell Automation Technologies, Inc., Mayfield Heights, OH (US)

(72) Inventors: Zoran Vrankovic, Greenfield, WI (US); Gennadi Sizov, Shorewood, WI (US); Gary L. Skibinski, Milwaukee, WI (US); David A. Figie, Menomonee Falls, WI (US); Yao Da, Mequon, WI (US); Todd M. Oestreich, Jackson, WI (US); Adam M. Shea, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 4 days.

(21) Appl. No.: 17/103,820

(22) Filed: Nov. 24, 2020

(65) Prior Publication Data

US 2021/0091697 A1    Mar. 25, 2021

Related U.S. Application Data

(63) Continuation of application No. 16/580,736, filed on Sep. 24, 2019, now Pat. No. 10,879,826.

(51) Int. Cl.
*H02P 23/04* (2006.01)
*H02P 27/08* (2006.01)
(Continued)

(52) U.S. Cl.
CPC ............. *H02P 23/04* (2013.01); *H02M 1/14* (2013.01); *H02M 1/44* (2013.01); *H02M 5/4585* (2013.01);
(Continued)

(58) Field of Classification Search
CPC ........... H02P 23/04; H02P 27/06; H02P 27/08
(Continued)

(56) References Cited

U.S. PATENT DOCUMENTS

| | | |
|---|---|---|
| 65,318,421 | 3/2003 | LeDoux et al. |
| 7,471,008 B2 | 12/2008 | Stahlhut et al. |

(Continued)

OTHER PUBLICATIONS

Wu et al.; "High-Frequency, GaN Diode-Free Motor Drive Inverter with Pure Sine Wave Output"; First published at PCIM Europe 2012; www.powertransmission.com—(4) pages.

*Primary Examiner* — David Luo
(74) *Attorney, Agent, or Firm* — Boyle Fredrickson, SC

(57) ABSTRACT

A motor drive that outputs a sinusoidal waveform utilizes power switching devices operable at high switching frequencies. The switching devices may be operated, for example, between twenty kilohertz and one megahertz. A first filter is included at the output of the motor drive which has a bandwidth selected to attenuate voltage components at the output which are at the switching frequency or multiples thereof such that the output voltage waveform is generally sinusoidal. Additional filtering is included within the motor drive to establish a circulation path for common mode currents within the motor drive. Further, a shield is provided adjacent to those components within the motor drive that may experience voltage or current waveforms at the switching frequency or multiples thereof to cause radiated emissions to establish eddy currents within the EMI shield rather than passing through the shield into the environment.

20 Claims, 24 Drawing Sheets

(51) Int. Cl.
*H02M 1/44* (2007.01)
*H02M 7/5387* (2007.01)
*H02M 1/14* (2006.01)
*H02M 5/458* (2006.01)
*H02M 7/04* (2006.01)

(52) U.S. Cl.
CPC ......... *H02M 7/04* (2013.01); *H02M 7/53871* (2013.01); *H02P 27/08* (2013.01); *H02P 2201/01* (2013.01)

(58) Field of Classification Search
USPC .................................................. 318/504, 494
See application file for complete search history.

(56) References Cited

U.S. PATENT DOCUMENTS

| | | | |
|---|---|---|---|
| 7,957,166 B2 | 6/2011 | Schnetzka et al. | |
| 8,928,264 B2 * | 1/2015 | Taniguchi | H02P 25/188 318/400.26 |
| 9,985,566 B2 * | 5/2018 | Jiang | B66B 1/308 |

* cited by examiner

FIG. 5

SYSTEM AND METHOD FOR SINUSOIDAL OUTPUT AND INTEGRATED EMC FILTERING IN A MOTOR DRIVE

CROSS-REFERENCE TO RELATED APPLICATIONS

This application is a continuation of and claims priority to U.S. application Ser. No. 16/580,736 filed Sep. 24, 2019, the entire contents of which is incorporated herein by reference.

BACKGROUND INFORMATION

The subject matter disclosed herein relates to motor drive topologies with an improved output voltage waveform supplied by the motor drive. More specifically, the motor drive provides a sinusoidal output voltage waveform while containing radiated and conducted electromagnetic emissions within the motor drive.

As is known to those skilled in the art, motor drives are utilized to control operation of a motor. According to one common configuration, a motor drive includes a DC bus having a DC voltage of suitable magnitude from which an AC voltage may be generated and provided to an AC motor. The DC voltage may be provided as an input to the motor drive or, alternately, the motor drive may include a converter section which converts an AC voltage input to the DC voltage present on the DC bus. The converter section may be passive, including conventional diode rectification, or active, including controlled power electronic switching devices, either of which may convert an AC voltage input to a DC voltage for the DC bus. The power electronic switching devices in an active rectifier may be selected from transistors, such as insulated gate bipolar transistors (IGBTs) or metal oxide semiconductor field-effect transistors (MOSFETs), thyristors, or silicon-controlled rectifiers (SCRs). The power electronic switching device may also include a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus.

The motor drive receives a command signal which indicates the desired operation of the motor. The command signal may be a desired torque, speed, or position at which the motor is to operate. The torque, speed, or position of the motor are controlled by varying the amplitude and frequency of the AC voltage applied to the stator. An inverter section is provided between the DC bus and the output of the motor drive to generate the controlled AC voltage. The inverter section includes power electronic switching devices, such as IGBTs, MOSFETs, thyristors, or SCRs, and a reverse conduction power electronic device connected in parallel across the power electronic switching device. The motor is connected to the output terminals of the motor drive, and the controller generates the switching signals to rapidly switch the switching devices in the inverter on and off at a predetermined switching frequency and, thereby, to alternately connect or disconnect the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

As is also known, the output voltage waveform generated by modulation techniques is a series of square waves, where the magnitude may be zero volts, a maximum positive voltage, or a maximum negative voltage. The duration for which the voltage is connected to zero voltage, the maximum positive voltage, or the maximum negative voltage within any switching period results in an average value of the output voltage for that switching period. The output voltage is regulated to provide a waveform having a fundamental component corresponding to a desired AC output voltage. The modulation typically occurs at frequencies ranging from the hundreds of hertz to tens of kilohertz while the desired fundamental frequency of the AC output voltage is typically in the tens to hundreds of hertz. While the AC output voltage contains a fundamental component, the modulation introduces components at the switching frequency and harmonics thereof. These components may be conducted, for example, via a cable connected between the motor drive and a motor to be controlled by the motor drive or radiated from the motor drive generating conducted or radiated electromagnetic interference (EMI) for other electronic components located near the motor drive, cabling, or motor.

As is also known to those skilled in the state of the art, the non-sinusoidal PWM output voltage includes high dv/dt voltage transitions which generate possible motor insulation failure and system ground current issues. First, high dv/dt transitions cause uneven voltage distributions across motor windings. A high percentage of the DC bus voltage is distributed across the first few incoming turns of the stator coil and the corresponding winding insulation, which may cause insulation failure. Second, high dv/dt transitions may cause doubling of the DC bus voltage magnitude to be observed on the output cable and at the motor terminals. The doubling of the DC bus voltage results from standing waves or reflected voltages present on the cable as a result of impedance mismatch as defined by well-known pulsed transmission line theory, leading to insulation failure. Third, high dv/dt transitions from conducted emissions along the cable and into the motor may be transmitted via stray ground capacitance and lead to uncontrolled external paths of ground noise current spikes that may adversely affect nearby sensitive equipment. Higher switching frequencies increase the dv/dt transitions and increase the magnitude of the ground noise current spikes.

Thus, it would be desirable to provide an improved motor drive topology that outputs a sinusoidal waveform which has a low dv/dt transition.

It would also be desirable to provide an improved motor drive topology that includes integrated EMI filtering to contain conducted or radiated EMI content resulting from modulation techniques within the motor drive.

BRIEF DESCRIPTION

The subject matter disclosed herein describes a motor drive that outputs a sinusoidal waveform and eliminates EMI conducted or radiated from the motor drive. The motor drive utilizes power switching devices operable at high switching frequencies. The switching devices may be operated, for example, between twenty kilohertz (20 kHz) and one megahertz (1 MHz). As a result of the high frequency switching, the conducted and radiated emissions generated are similarly in this high frequency range or multiples thereof. As previously indicated, the higher switching frequency results in a greater dv/dt transition and an increased magnitude of these conducted emissions. However, the higher frequency emissions can be attenuated by filtering components having a smaller physical size than emissions at a lower frequency. As a result, the present inventors have been able to incorporate the filtering components within the motor drive.

The motor drive includes multiple filters and shielding to contain conducted and radiated EMI content resulting from modulation techniques within the motor drive. A first filter is included at the output of the motor drive which has a bandwidth selected to attenuate voltage components at the output at the switching frequency or multiples thereof such that the output voltage waveform is generally sinusoidal. Additional filtering is included within the motor drive to establish a circulation path for common mode currents within the motor drive. Finally, an electromagnetic interference (EMI) shield is provided adjacent to those components within the motor drive that may experience voltage or current waveforms at the switching frequency or multiples thereof. The EMI shield is made of a conductive material such that radiated emissions establish eddy currents within the EMI shield rather than passing through the shield into the environment. The result is a motor drive with a sinusoidal voltage output that satisfies electromagnetic compatibility (EMC) requirements without requiring additional chokes, filters, or shielding external to the motor drive.

According to one embodiment of the invention, a motor drive includes an input configured to receive an AC input voltage and a converter section having an input and an output. The input to the converter section is configured to receive the AC input voltage, and the output from the converter section is configured to output a DC voltage. The converter section is operative to convert the AC input voltage to the DC voltage. The motor drive also includes an input filter operatively connected between the input of the motor drive and the input of the converter section, where the input filter includes a common connection. The motor drive has a DC bus, a DC bus capacitance, and an inverter section. The DC bus has a positive rail connected to a first terminal of the output of the converter section and a negative rail connected to a second terminal of the output of the converter section. The DC bus capacitance is connected between the positive rail and the negative rail of the DC bus at the output of the converter section. The inverter section has an input and an output. The input of the inverter section is configured to receive the DC voltage from the DC bus, and the output from the inverter section is configured to output an AC output voltage. The inverter section is operative to covert the DC voltage to the AC output voltage. A high frequency capacitance is connected between the positive rail and the negative rail of the DC bus at the input of the inverter section, and an output from the motor drive is configured to supply the AC output voltage to a motor operatively connected to the motor drive. The motor drive also includes an output filter operatively connected between the output of the inverter section and the output of the motor drive. The output filter is connected to the common connection and common mode currents present in the motor drive circulate within the motor drive via the common connection between the input filter and the output filter.

According to another embodiment of the invention, a motor drive includes an input configured to receive an AC input voltage and a converter section having an input and an output. The input to the converter section is configured to receive the AC input voltage and the output from the converter section is configured to output a DC voltage. The converter section is operative to convert the AC input voltage to the DC voltage. The motor drive also includes a DC bus, a DC bus capacitance, and an inverter section. The DC bus has a positive rail connected to a first terminal of the output of the converter section and a negative rail connected to a second terminal of the output of the converter section. The DC bus capacitance is connected between the positive rail and the negative rail of the DC bus at the output of the converter section. The inverter section has an input and an output. The input of the inverter section is configured to receive the DC voltage from the DC bus and the output of the inverter section is configured to output an AC output voltage. The inverter section is operative to covert the DC voltage to the AC output voltage. A high frequency capacitance is connected between the positive rail and the negative rail of the DC bus at the input of the inverter section, and an output of the motor drive is configured to supply the AC output voltage to a motor operatively connected to the motor drive. The motor drive also includes a first filter and a second filter. The first filter is operatively connected between the output of the converter section and the high frequency capacitance, where the first filter includes a common connection. The second filter is operatively connected between the output of the inverter section and the output of the motor drive. The second filter is connected to the common connection, and common mode currents present in the motor drive circulate within the motor drive via the common connection between the first filter and the second filter.

According to still another embodiment of the invention, a motor drive includes an input, a converter section, an inverter section, and an output. The input is configured to receive an AC input voltage, and the converter section is configured to convert the AC input voltage to a DC bus voltage The inverter section is configured to convert the DC bus voltage to an AC output voltage using a modulation technique, where the modulation technique executes at a switching frequency, and the output is configured to supply an AC output voltage. A DC bus is operative to conduct the DC bus voltage between the converter section and the inverter section, and a sinusoidal output filter is operative to attenuate harmonic content on the AC output voltage at frequencies equal to or greater than the switching frequency. A first portion of an electromagnetic compatibility (EMC) filter operatively is connected between the input of the motor drive and the converter section, and a second portion of the EMC filter is operatively connected between the inverter section and the output of the motor drive. Both the first and second portions of the EMC filter are connected to a common connection, where common mode currents present in the motor drive circulate within the motor drive via the common connection between the first and second portions of the EMC filter.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 5 is a schematic representation of a motor drive with integrated EMC filtering configured to provide a sinusoidal voltage output according to another embodiment of the invention;

Figure 1:
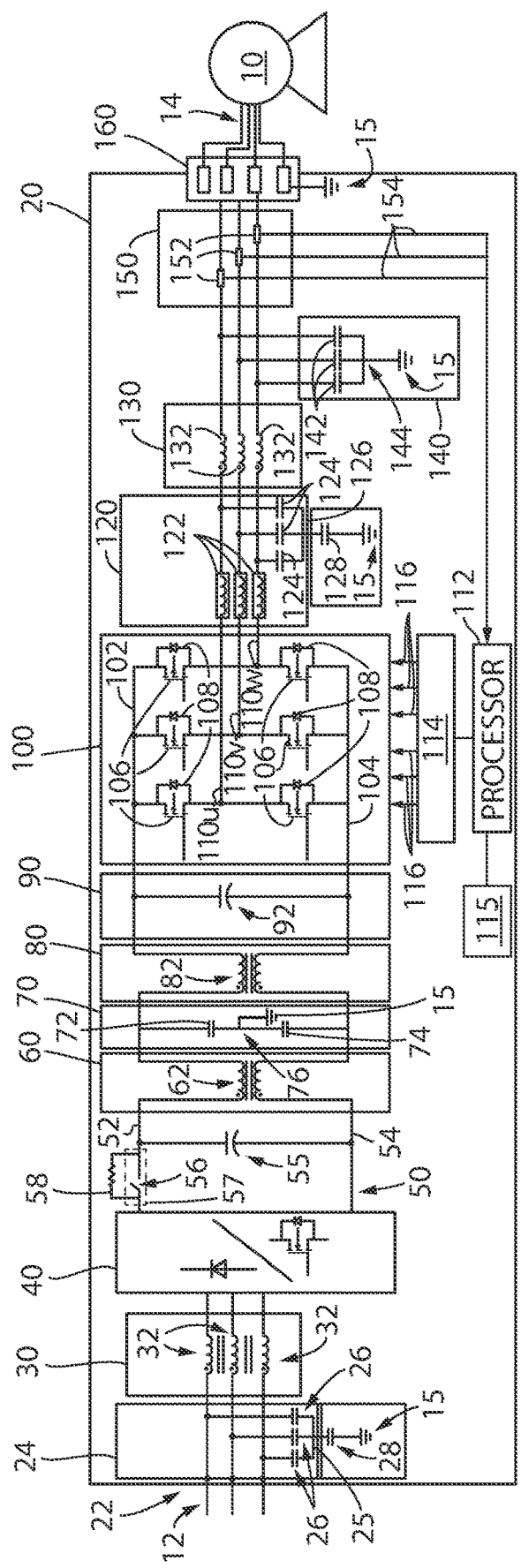
FIG. 1 is a schematic representation of a motor drive with integrated EMC filtering configured to provide a sinusoidal voltage output according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, a first embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

After the input 22 of the motor drive 20, a first filter 24 and a second filter 30 are connected in series between the input 22 and a converter section 40 of the motor drive. The first filter 24 includes a capacitor 26 connected between each phase of the AC input voltage and a common connection point 25 for the first filter. For the three-phase AC input voltage 12 illustrated, the first filter 24 includes three capacitors 26 each connected between one phase of the input voltage and the common connection point 25. Optionally, a fourth capacitor 28 may also be provided. The fourth capacitor 28 is connected between the common connection point 25 of the first filter 24 and a common connection 15 for the motor drive 20. The common connection 15 shown in FIG. 1 is a ground connection. As will be discussed in more detail below, connecting multiple filters to the common connection 15 will allow common mode currents 180 (shown in FIG. 2) to circulate within the motor drive 20. The second filter 30 includes an AC common mode inductor 32, also referred to as an AC common mode choke, connected in series with the AC input voltage 12. The AC common mode inductor 32 includes a winding for each phase of the AC input voltage which may be wrapped around a single core or, optionally, windings wrapped around separate cores. The windings for the common mode inductor 32 are connected between the first filter and an input 42 for the converter section 40.

Figure 15:
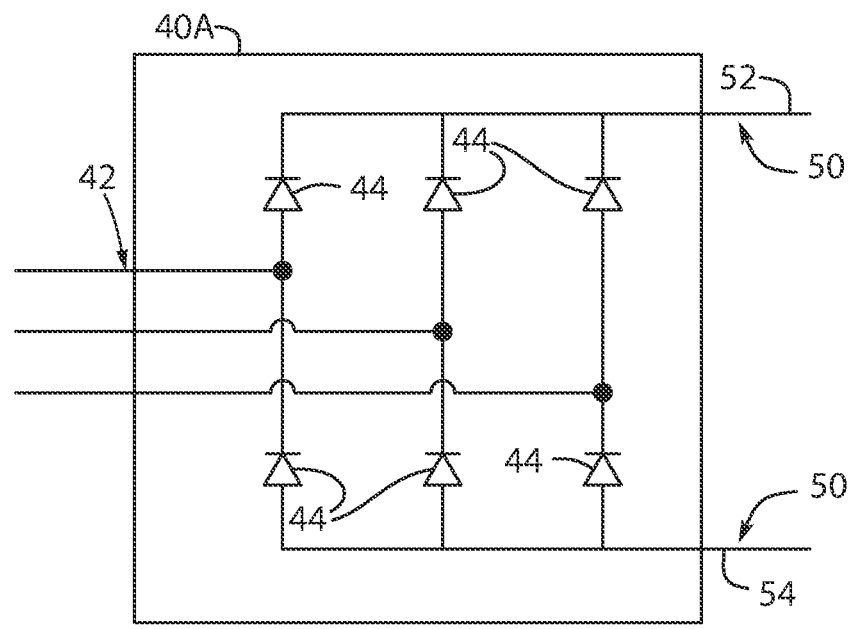
FIG. 15 is a schematic representation of a passive converter section for use in the motor drive of any one of FIGS. 1 to 14.
Figure 16:
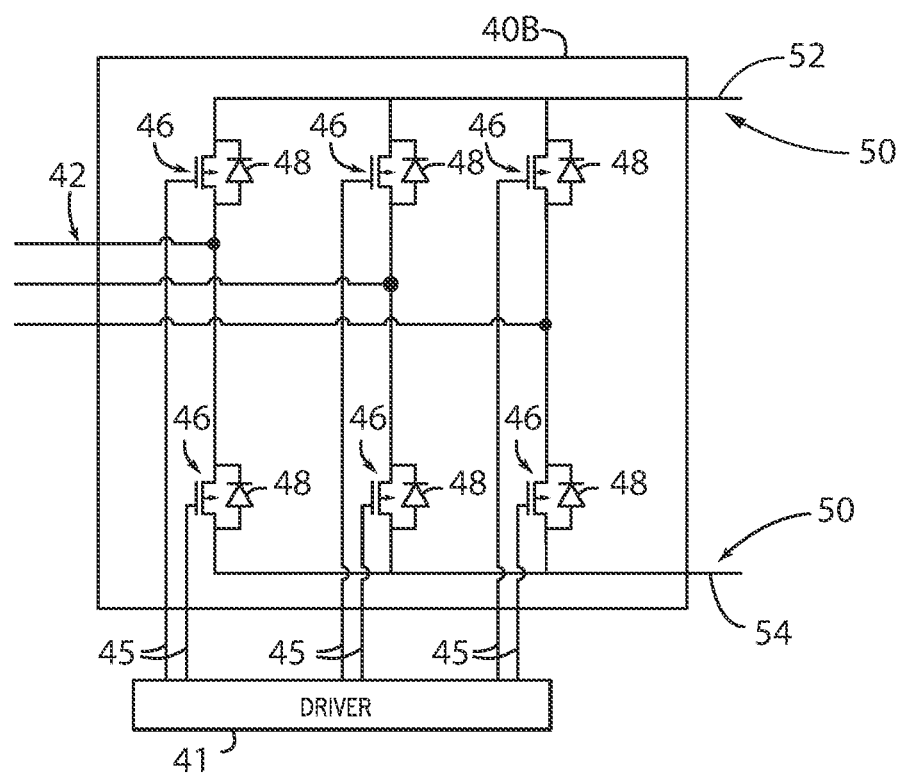
FIG. 16 is a schematic representation of an active converter section for use in the motor drive of any one of FIGS. 1 to 14.

The converter section 40 may include any electronic device suitable for passive or active rectification as is understood in the art. With reference also to FIG. 15, the illustrated converter section 40A is a passive converter and includes a set of diodes 44 forming a diode bridge. The converter section 40 receives the AC voltage at an input 42, rectifies the three-phase AC voltage to a DC voltage, and provides the DC voltage to a DC bus 50 at an output of the converter section. With reference also to FIG. 16, the illustrated converter section 40B is an active converter. An active converter 40B includes switching devices including, but not limited to, thyristors, silicon-controlled rectifiers (SCRs), or transistors, such as IGBTs or MOSFETs, to convert the voltage at the input 42 from AC to a DC voltage for the DC bus 50. According to the illustrated embodiment, a pair of transistors 46 is connected between each phase of the input voltage and the DC bus 50. A first transistor in the pair is connected between the input voltage and a positive rail 52 of the DC bus 50, and a second transistor in the pair is connected between the input voltage and a negative rail 54 of the DC bus 50. Diodes 48 may be connected in a reverse parallel manner across each transistor 46. A driver circuit 41 generates switching signals 45 to control operation of each transistor 46. The active converter 40B may both convert the AC voltage to a DC voltage as well as allow for bidirectional current flow between the input 42 of the converter section 40B and the DC bus 50. The DC bus 50 is connected to the output of the converter section, and the DC voltage output by the converter is present between the positive rail 52 and the negative rail 54 of the DC bus 50.

A DC bus capacitor 55 is connected between the positive and negative rails, 52 and 54, to reduce the magnitude of the ripple voltage resulting from converting the AC voltage to a DC voltage. It is understood that the DC bus capacitor 55 may be a single capacitor or multiple capacitors connected in parallel, in series, or a combination thereof. The magnitude of the DC voltage between the negative and positive rails, 54 and 52, is generally equal to the magnitude of the peak of the AC input voltage.

As shown in FIG. 1, a DC bus charge circuit 57 may be connected on the DC bus 50. In the illustrated embodiment, the DC bus charge circuit 57 is connected between the output of the converter section 40 and the DC bus capacitor 55. Initially, a switch 56 is in a normally open state, establishing a conduction path from the output of the converter section 40 to the positive rail 52 via a charge resistor 58. The charge resistor 58, in combination with the DC bus capacitor 55 establishes a charging time constant, as is understood in the art, to allow the DC voltage on the DC bus 50 to charge from zero volts DC at power up to a voltage level approximately equal to the full DC bus voltage resulting from rectifying the AC input voltage. When the DC voltage level reaches a preset charged level, the switch 56 is closed, bypassing the charge resistor 58 and allowing current to flow directly from the converter section 40 onto the DC bus 50.

The DC bus 50 is connected in series between the converter section 40 and an inverter section 100. Also illustrated either in series with or parallel to the DC bus 50 between the converter section 40 and the inverter section 100 are a third filter 60, fourth filter 70, fifth filter 80, and sixth filter 90. The third filter 60 includes a first DC common mode inductor 62, also referred to as a DC common choke, connected in series with the DC bus 50. Conductors for both the positive rail 52 and the negative rail 54 are wrapped around a common core and connected in series with each rail. The fifth filter 80 similarly includes a second DC common mode inductor 82, also referred to as a DC common choke, connected in series with the DC bus 50. Conductors for both the positive rail 52 and the negative rail 54 are wrapped around a common core and connected in series with each rail. Optionally, a single filter may be provided with just one DC common mode inductor sized according to application requirements. In still other embodiments, no DC common mode inductor may be required as will be discussed in more detail below.

According to the embodiment illustrated in FIG. 1, the fourth filter 70 is positioned between the third filter 60 and the fifth filter 80 along the DC bus 50. The fourth filter 70 includes a first DC bus filter capacitor 72 and a second DC bus filter capacitor 74. A first terminal of the first DC bus filter capacitor 72 is connected to the positive rail 52 and a second terminal of the first DC bus filter capacitor 72 is connected to a common point 76 for the filter. A first terminal of the second DC bus filter capacitor 74 is connected to the negative rail 54 and a second terminal of the second DC bus filter capacitor 74 is connected to the common point 76 for the filter. The two DC bus filter capacitors 72, 74 are preferably equal in capacitance and create a balanced voltage potential across each capacitor. The common point 76 is connected to the common connection 15 of the motor drive 20, establishing one additional flow path for common mode currents to circulate within the motor drive 20.

The sixth filter 90 includes a high frequency capacitance 92 connected between the positive rail 52 and the negative rail 54 of the DC bus 50. It is understood that the high frequency capacitance 92 may be a single capacitor or multiple capacitors connected in parallel, in series, or a combination thereof. The high frequency capacitance 92 is connected at the input of the inverter section 100 and is used to reduce the magnitude of the ripple voltage present on the DC bus 50 as a result of the high frequency switching in the inverter section to convert the DC voltage back to an AC voltage. The output of the multi-stage filter section is a filtered DC bus and is shown as a positive filtered DC bus rail 102 and a negative filtered DC bus rail 104.

The inverter section 100 consists of switching elements, such as transistors, thyristors, or SCRs as is known in the art. The illustrated inverter section 100 includes a power metal-oxide-semiconductor field-effect transistor (MOSFET) 106 and a reverse connected device 108, which may be a free-wheeling diode or a MOSFET's inherent body diode, connected in pairs between the filtered positive rail 102 and each phase of the output voltage (110U, 110V, 110W) as well as between the filtered negative rail 104 and each phase of the output voltage. Each of the transistors 106 receives switching signals 116 to selectively enable the transistors 106 and to convert the DC voltage from the DC bus 50 into a controlled three phase output voltage to the motor 10. When enabled, each transistor 106 connects the respective rail 102, 104 of the DC bus to one output phase 110, which is, in turn, connected between the inverter section 100 and the output terminal 160.

According to the embodiment illustrated in FIG. 1, a processor 112 and a driver circuit 114 may include and manage execution of modules used to control operation of the motor drive 20. The illustrated embodiment is not intended to be limiting and it is understood that various features of each module may be executed by another module and/or various combinations of other modules may be included in the processor 112 without deviating from the scope of the invention. The modules may be stored programs executed on one or more processors, logic circuits, or a combination thereof. The processor 112 may be implemented, for example, in a microprocessor, application specific integrated circuit (ASIC), field programmable gate array (FPGA), or other such customizable device. The motor drive 20 also includes a memory device 115 in communication with the processor 112. The memory device 115 may include transitory memory, non-transitory memory or a combination thereof. The memory device 115 may be configured to store data and programs, which include a series of instructions executable by the processor 112. It is contemplated that the memory device 115 may be a single device, multiple devices, or incorporated, for example, as a portion of another device such as an application specific integrated circuit (ASIC). The processor 112 is in communication with the memory 115 to read the instructions and data as required to control operation of the motor drive 20.

According to one embodiment of the invention, the processor 112 receives a reference signal identifying desired operation of the motor 10 connected to the motor drive 20. The reference signal may be, for example, a torque reference (T*), a speed reference (ω*), or a position reference (θ*). The processor 112 also receives feedback signals indicating the current operation of the motor drive 20. The motor drive 20 may include a voltage sensor and/or a current sensor operatively connected to the DC bus 50 and generating a feedback signal corresponding to the magnitude of voltage and/or current present on the DC bus. The motor drive 20 may also include one or more voltage sensors and/or current sensors 152 on each phase of the AC output voltage generating a feedback signal 154 corresponding to the magnitude of voltage and/or current present at the output 160 of the motor drive 20.

The processor 112 utilizes the feedback signals and the reference signal to control operation of the inverter section 100 to generate an output voltage having a desired magnitude and frequency for the motor 10. The processor 112 may generate a desired output voltage signal to a driver module 114. The driver module 114, in turn, generates the switching signals 116, for example, by pulse width modulation (PWM) or by other modulation techniques. The switching signals 116 subsequently enable/disable the transistors 106 to provide the desired output voltage to the motor 10, which, in turn, results in the desired operation of the motor 10.

Figure 24:
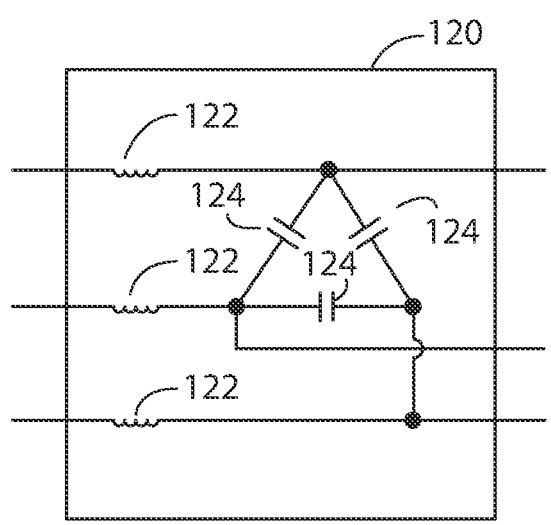
FIG. 24 is a schematic representation of the L-C filter of FIG. 1 with the capacitors connected in a delta configuration.

Between the inverter section 100 and the output terminal 160 are illustrated still additional filter sections either in series with or parallel to each phase of the AC output voltage. As illustrated, the motor drive 20 includes a seventh filter 120, an eighth filter 130, and a ninth filter 140. Each of the seventh, eighth, and ninth filters serve as output filters for the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. For the three-phase AC output voltage illustrated, the seventh filter 120 includes three capacitors 124 each connected between one phase of the output voltage and the common connection point 126. Alternately, the capacitors 124 may be connected in a delta configuration as shown in FIG. 24. Optionally, a fourth capacitor 128 may also be provided. The fourth capacitor 128 is connected between the common connection point 126 of the seventh filter 120 and the common connection 15 for the motor drive 20.

The eighth filter 130 is connected in series with the output of the seventh filter on each phase of the AC output voltage (110U, 110V, 110W). The eight filter includes an AC common mode inductor 132, also referred to as an AC common mode choke. The AC common mode inductor 132 includes a winding for each phase of the AC output voltage which may be wrapped around a single core or, optionally, include windings wrapped around separate cores.

The ninth filter 140 includes three capacitors 142 each connected between one phase of the AC output voltage and a common connection point 144 for the ninth filter. The common connection point 144 of the ninth filter 140 is connected to the common connection 15 for the motor drive 20. As previously indicated, connecting the common connection point 126, 144 of the seventh filter 120 or the ninth filter 140, respectively, to the common connection 15 will allow common mode currents to circulate within the motor drive 20. It is contemplated that only a portion of the filters (i.e., seventh, eighth, or ninth) are required in a particular embodiment to provide the necessary output filtering for the motor drive 20.

A current sense module 150 is provided after the output filtering. The current sense module 150 includes a current sensor 152 on each phase of the AC output voltage. Each current sensor 152 generates a current feedback signal 154 corresponding to the current present at the output 160 of the motor drive for each phase of the AC output.

The motor drive embodiment, as illustrated in FIG. 1 and described above, is not intended to be limiting. The described embodiment includes numerous filters of which various combinations and/or portions of the filters may be utilized to achieve a sinusoidal voltage output waveform while maintaining EMC compatibility. Satisfactory performance may be achieved with different combinations of the filters or with just a portion of the above-described filters. Although not intended to be exhaustive, several of the different embodiments will be described below.

Figure 2:
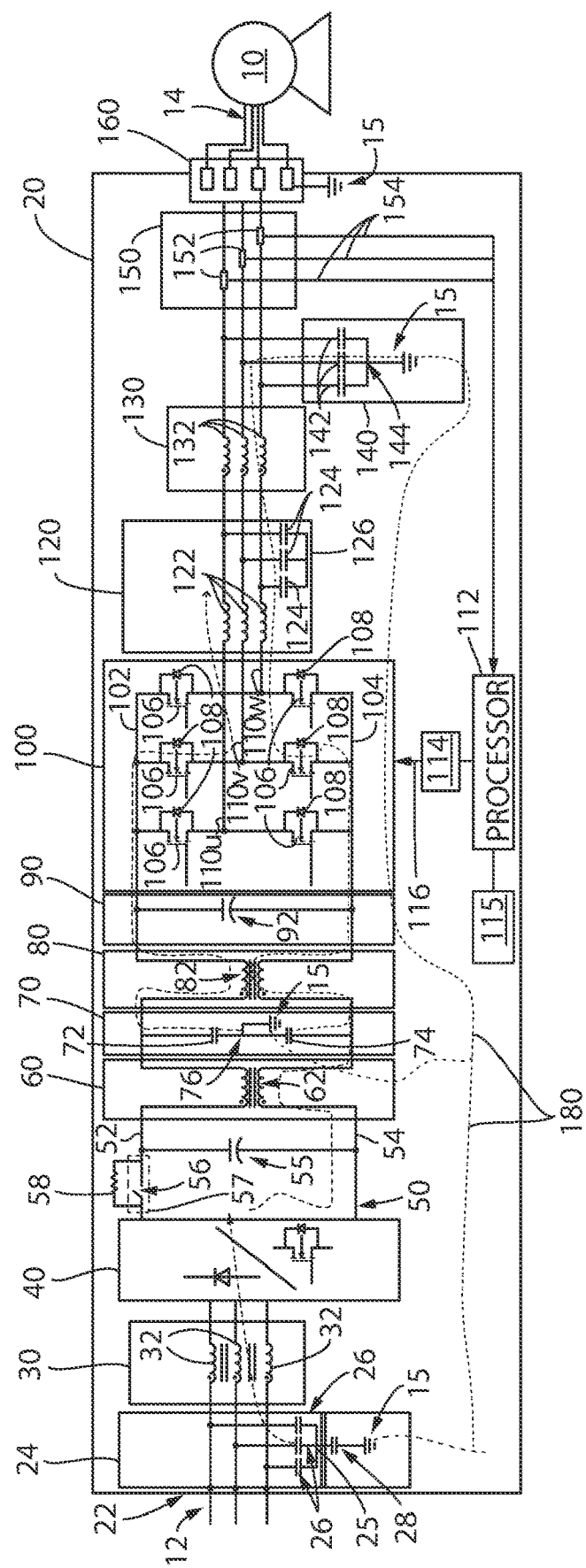
FIG. 2 is a schematic representation of a motor drive with integrated EMC filtering configured to provide a sinusoidal voltage output according to another embodiment of the invention.

Turning next to FIG. 2, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 2 includes the first filter 24 and the second filter 30 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the third filter 60, the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120, eighth filter 130, and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 3:
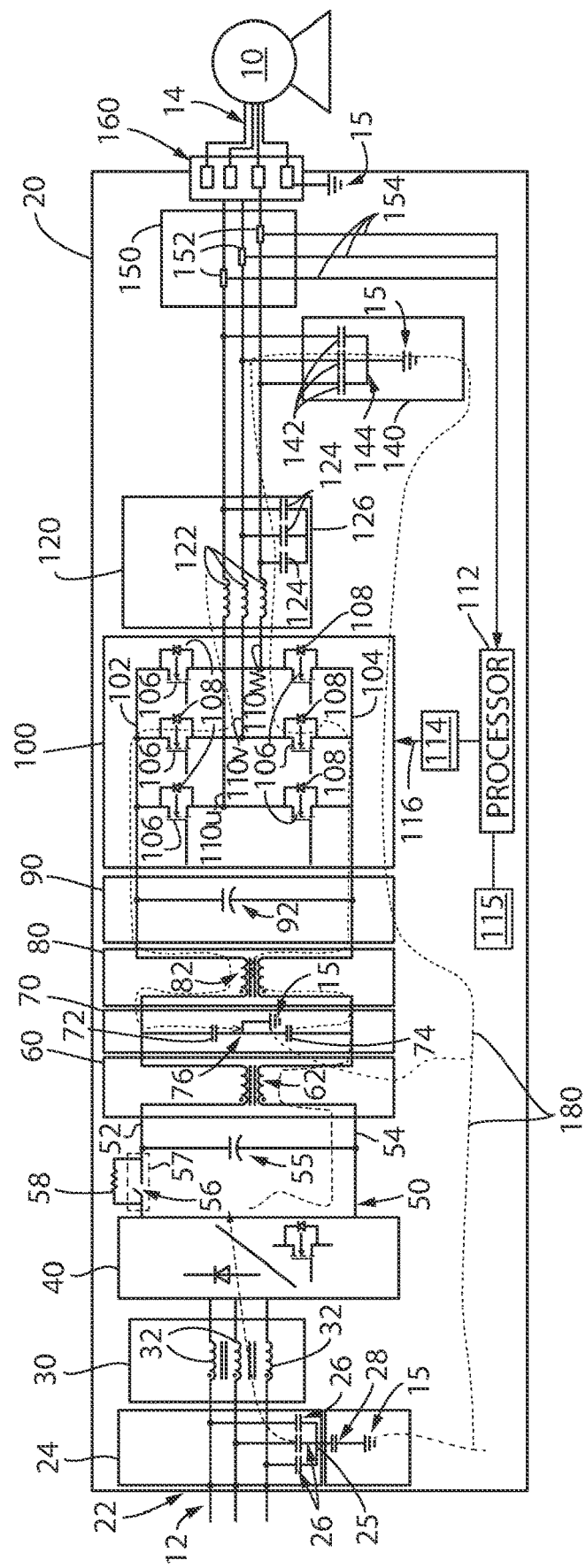
FIG. 3 is a schematic representation of a motor drive with integrated EMC filtering configured to provide a sinusoidal voltage output according to another embodiment of the invention.

Turning next to FIG. 3, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 3 includes the first filter 24 and the second filter 30 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the third filter 60, the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 4:
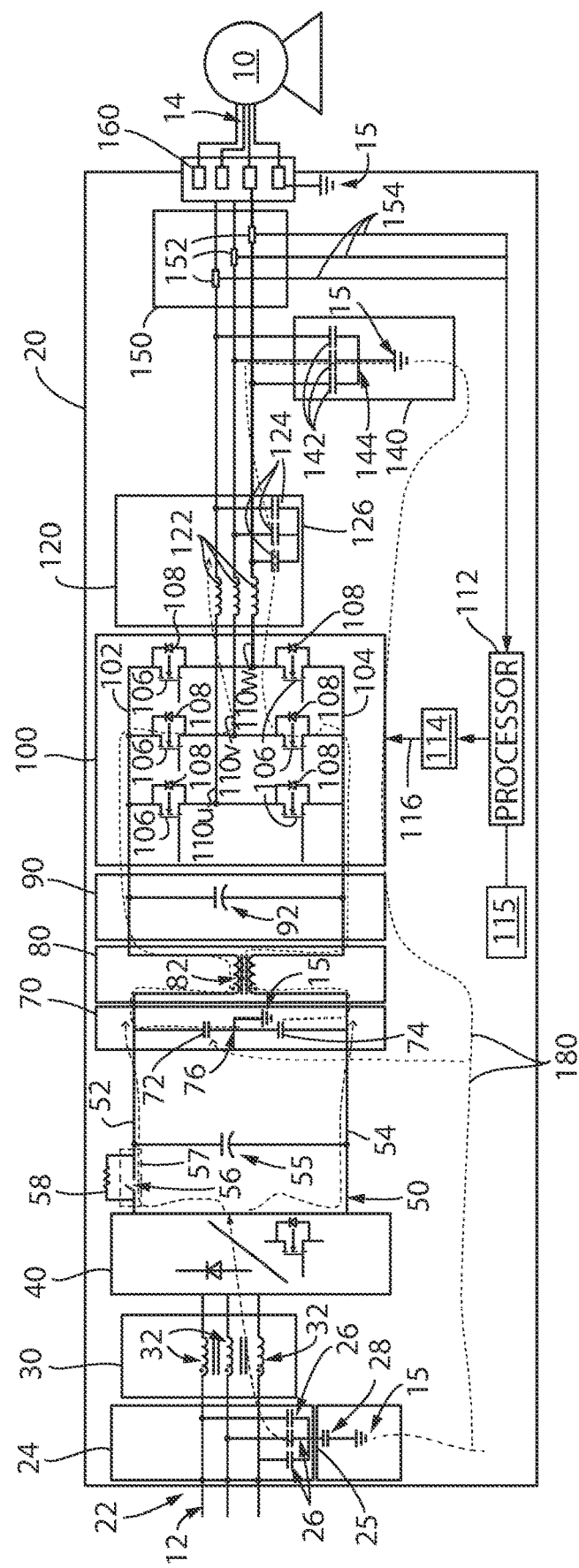
FIG. 4 is a schematic representation of a motor drive with integrated EMC filtering configured to provide a sinusoidal voltage output according to another embodiment of the invention.

Turning next to FIG. 4, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 4 includes the first filter 24 and the second filter 30 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a were configuration. In this embodiment, the optional fourth capacitor 128, discussed above with respect to FIG. 1, is not included.

Figure 5:
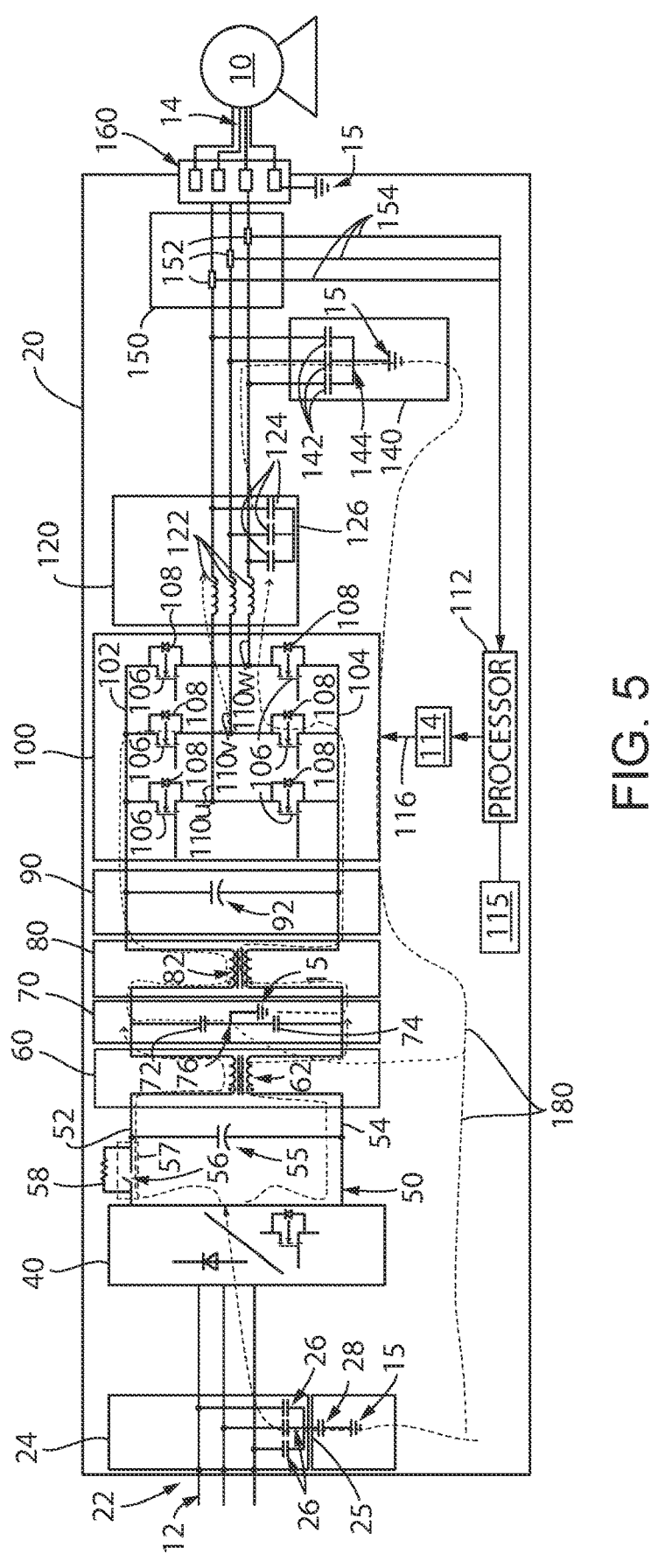

Turning next to FIG. 5, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 5 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the third filter 60, the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 6:
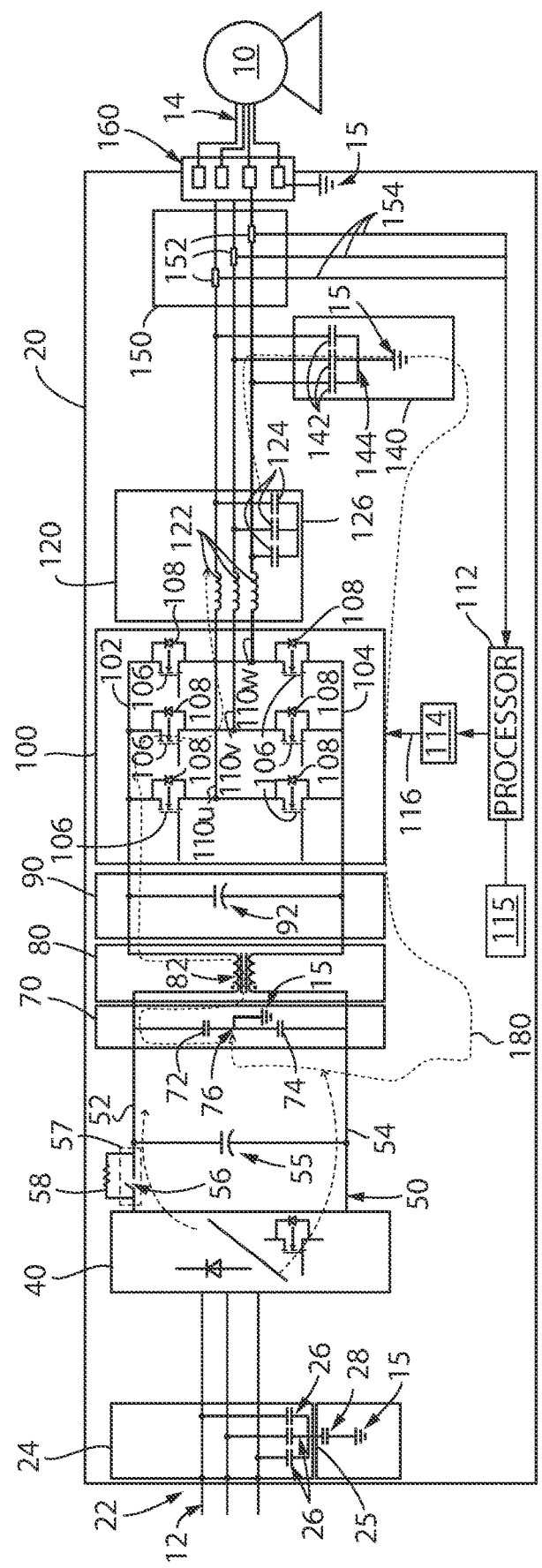
FIG. 6 is a schematic representation of a motor drive with integrated EMC filtering configured to provide a sinusoidal voltage output according to another embodiment of the invention.

Turning next to FIG. 6, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 6 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 7:
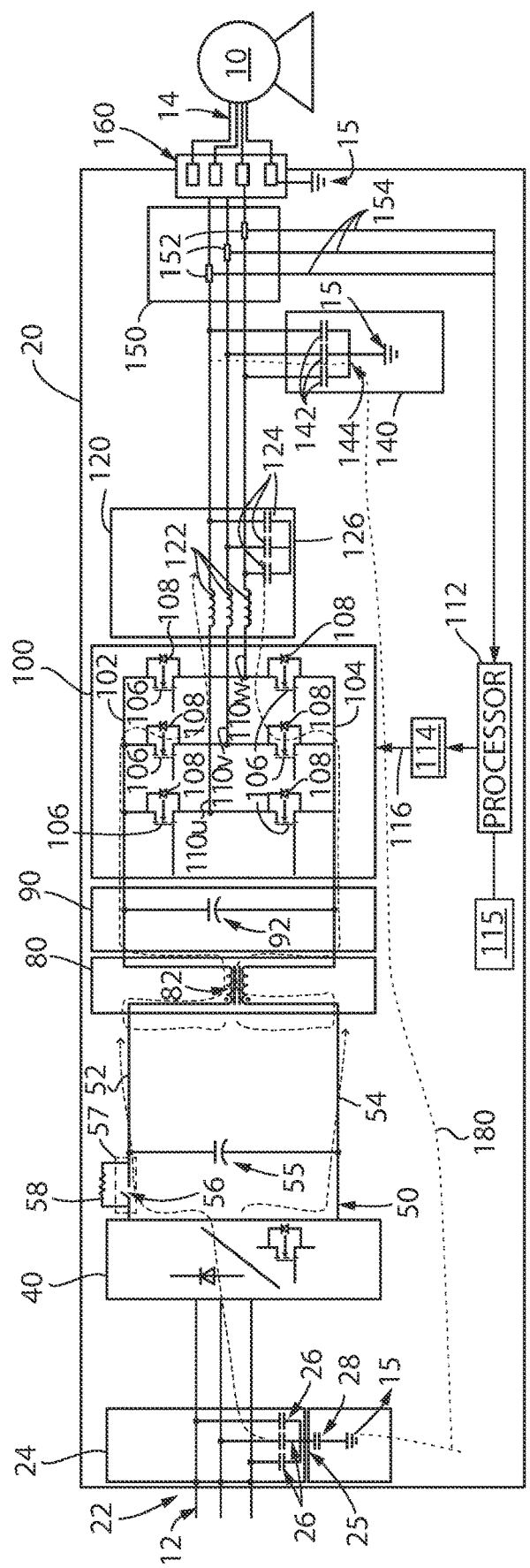
FIG. 7 is a schematic representation of a motor drive with integrated EMC filtering configured to provide a sinusoidal voltage output according to another embodiment of the invention.

Turning next to FIG. 7, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 7 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fifth filter 80 and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 8:
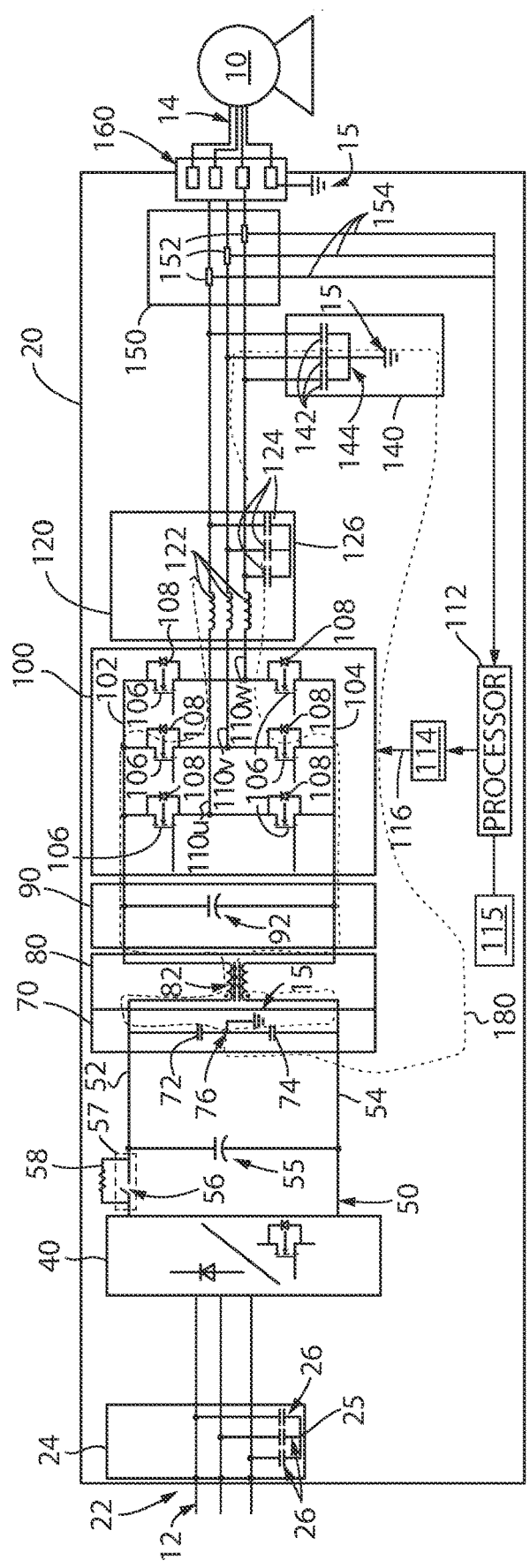
FIG. 8 is a schematic representation of a motor drive with integrated EMC filtering configured to provide a sinusoidal voltage output according to another embodiment of the invention.

Turning next to FIG. 8, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 8 includes the first filter 24 connected in series between the input 22 and the converter section 40 of the motor drive. The first filter 24 includes a capacitor 26 connected between each phase of the AC input voltage and a common connection point 25 for the first filter. In this embodiment, the optional fourth capacitor 28, discussed above with respect to FIG. 1, is not included. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 and ninth filter 140 are connected in series between the output of the inverter section 100 and the current sensing segment 150 of the motor drive 20. The seventh filter 120 includes an inductor 122 and a capacitor 124 for each phase of the AC output voltage. Each inductor 122 is connected in series with one phase of the output voltage (110U, 110V, 110W) at the output of the inverter section 100. Capacitors 124 are then connected after the inductors 122 and between each phase of the AC output voltage and a common connection point 126 for the seventh filter in a wye configuration. In this embodiment, the optional fourth capacitor 128, discussed above with respect to FIG. 1, is not included.

Figure 9:
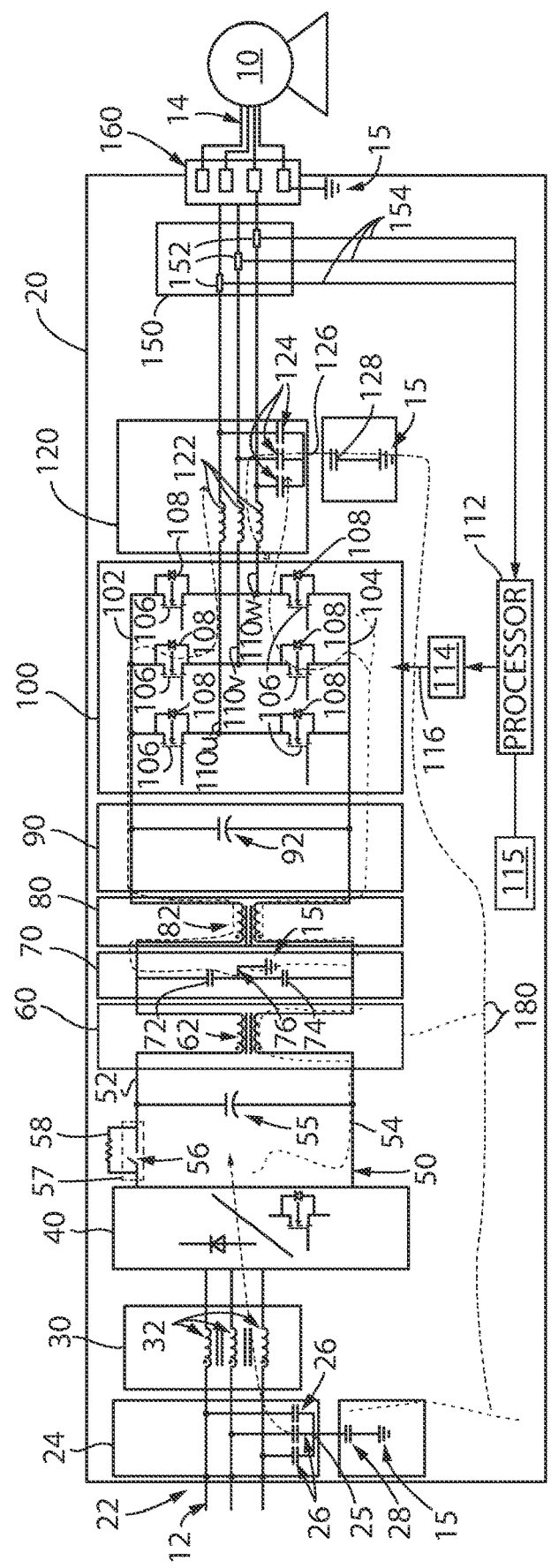
FIG. 9 is a schematic representation of a motor drive with integrated EMC filtering configured to provide a sinusoidal voltage output according to another embodiment of the invention.

Turning next to FIG. 9, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 9 includes the first filter 24 and the second filter 30 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the third filter 60, the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 10:
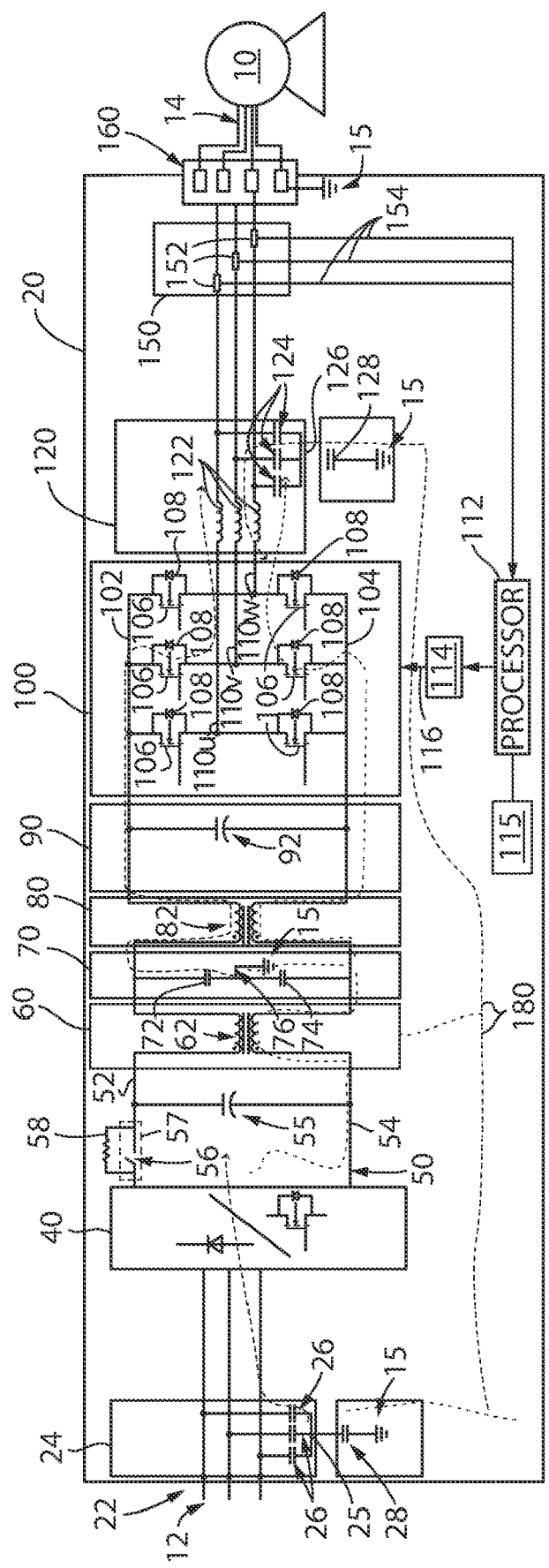
FIG. 10 is a schematic representation of a motor drive with integrated EMC filtering configured to provide a sinusoidal voltage output according to another embodiment of the invention.

Turning next to FIG. 10, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 10 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the third filter 60, the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 11:
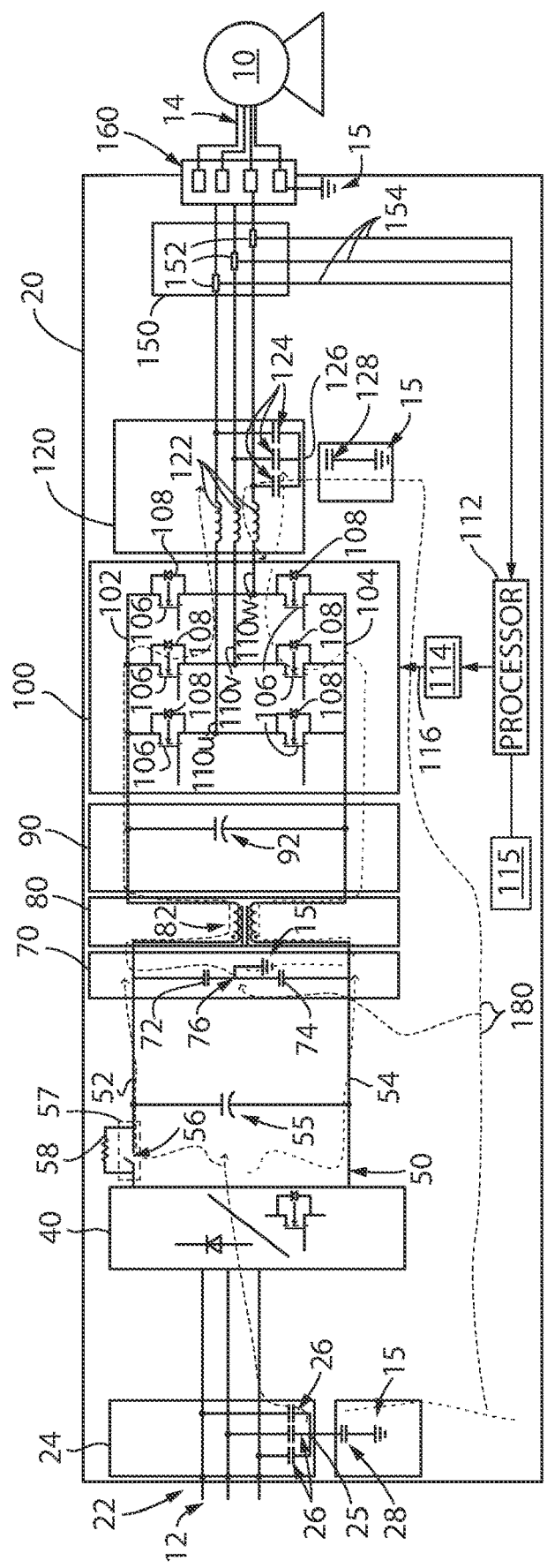
FIG. 11 is a schematic representation of a motor drive with integrated EMC filtering configured to provide a sinusoidal voltage output according to another embodiment of the invention.

Turning next to FIG. 11, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 11 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fourth filter 70, the fifth filter 80, and the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 12:
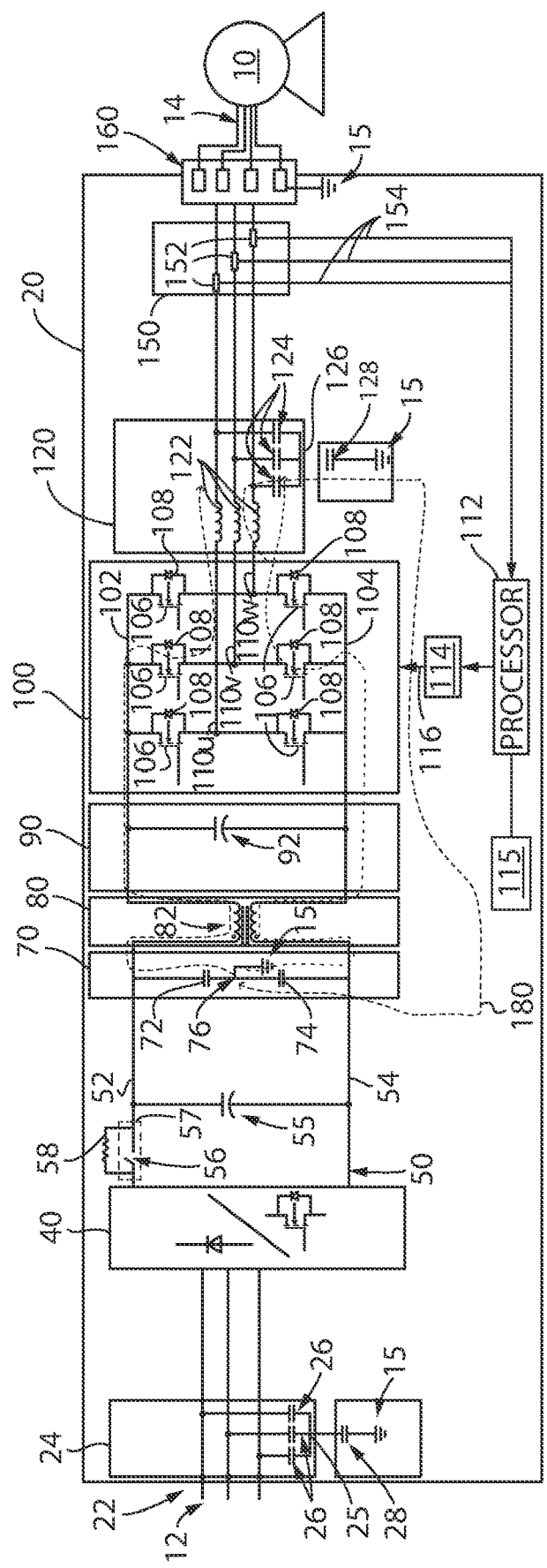
FIG. 12 is a schematic representation of a motor drive with integrated EMC filtering configured to provide a sinusoidal voltage output according to another embodiment of the invention.

Turning next to FIG. 12, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 12 includes the first filter 24 connected in series between the input 22 and the converter section 40 of the motor drive. The first filter 24 includes a capacitor 26 connected between each phase of the AC input voltage and a common connection point 25 for the first filter. In this embodiment, the optional fourth capacitor 28, discussed above with respect to FIG. 1, is not included. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fourth filter 70, the fifth filter 80 and the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 13:
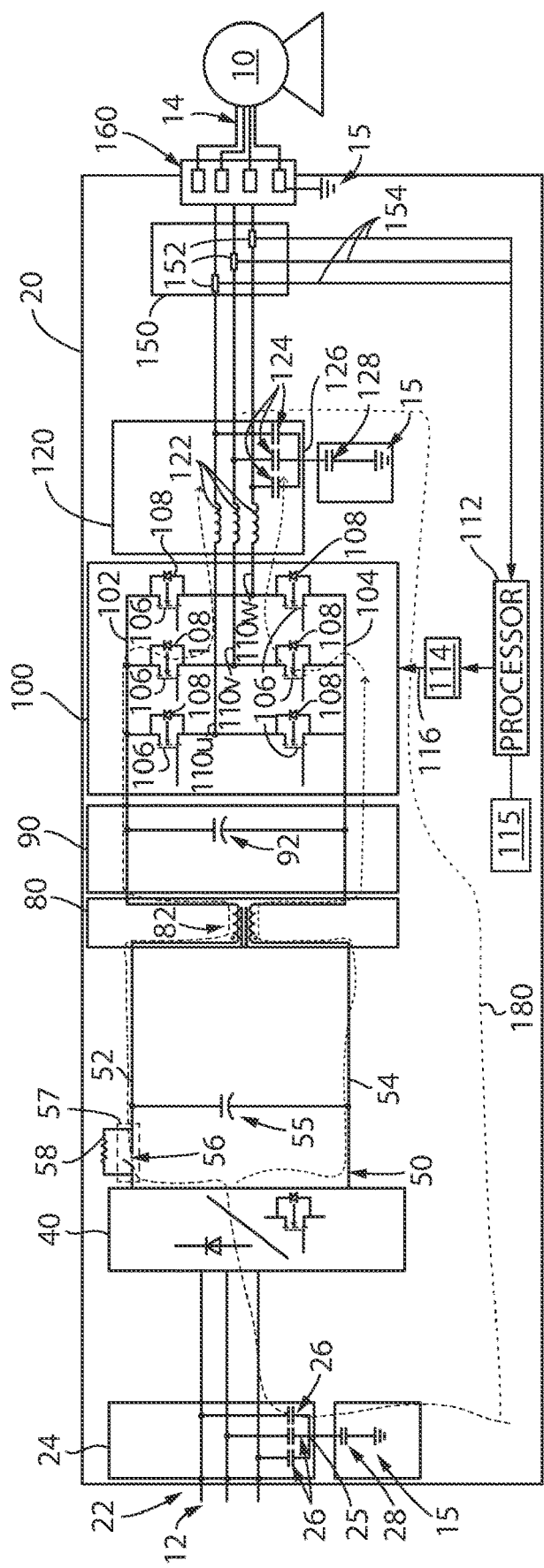
FIG. 13 is a schematic representation of a motor drive with integrated EMC filtering configured to provide a sinusoidal voltage output according to another embodiment of the invention.

Turning next to FIG. 13, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 13 includes the first filter 24 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the fifth filter 80 and the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 14:
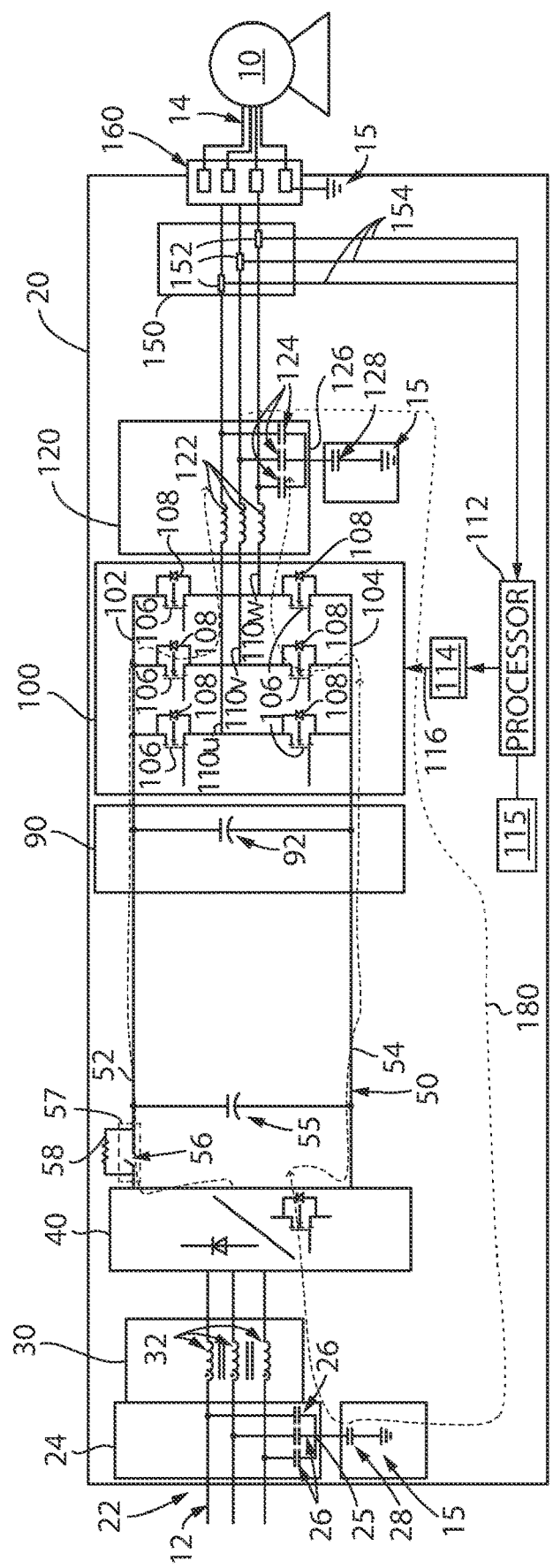
FIG. 14 is a schematic representation of a motor drive with integrated EMC filtering configured to provide a sinusoidal voltage output according to another embodiment of the invention.

Turning next to FIG. 14, another embodiment of a motor drive 20 incorporating EMI filtering and producing a sinusoidal voltage output is illustrated. An AC voltage 12 is provided at an input 22 to the motor drive 20. According to the illustrated embodiment, the AC voltage 12 is a three-phase AC input voltage. The motor drive supplies a sinusoidal output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for a ground conductor. It is understood that the illustrated conductors may be combined within a cable 14, run as individual conductors, or a combination thereof according to the application requirements.

The motor drive 20 illustrated in FIG. 14 includes the first filter 24 and the second filter 30 connected in series between the input 22 and the converter section 40 of the motor drive. The converter section 40 may be a passive converter section 40A or an active converter section 40B as discussed above. The DC bus charge circuit 57 is connected at an output of the converter section 40 and between the converter section and the DC bus capacitor 55. The motor drive further includes the sixth filter 90 connected in series between the DC bus capacitor 55 and the inverter section 100. The processor 112 and driver circuit 114 control operation of the inverter section 100 as discussed above. The seventh filter 120 is connected in series between the output of the inverter section 100 and the current sensing segment 150 of the motor drive 20.

Figure 17:
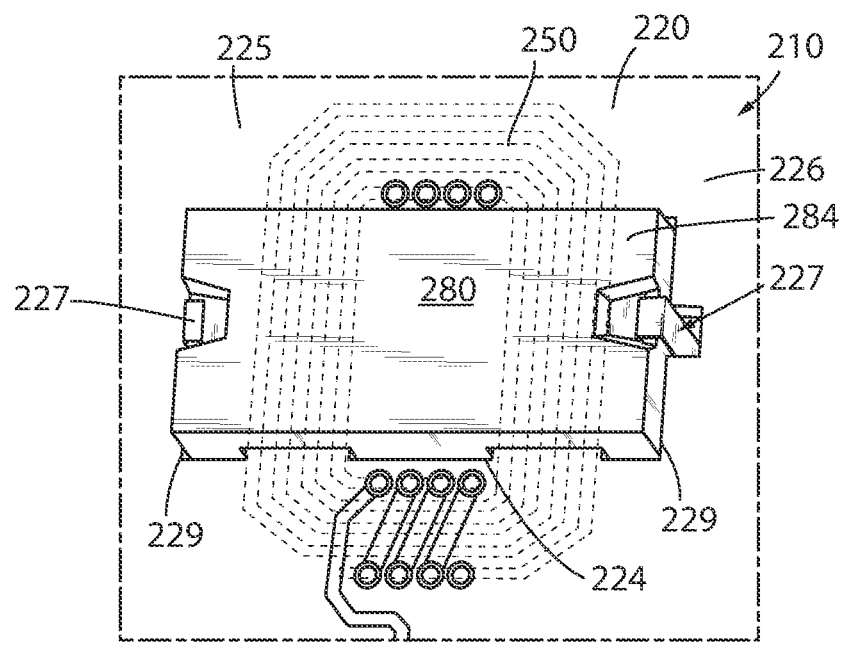
FIG. 17 is a top view of a magnetic component integrated into a printed circuit board (PCB) for use as an inductive component in one of the filters according to one embodiment of the invention.
Figure 18:
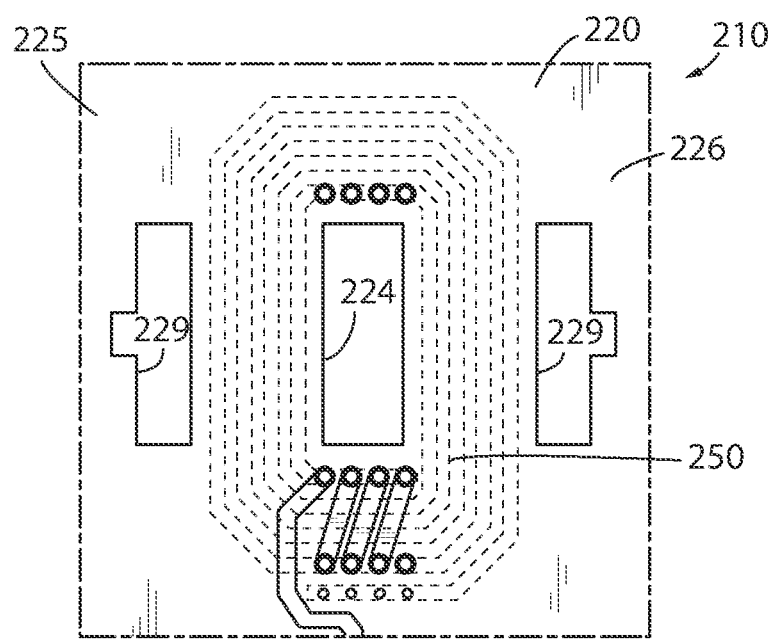
FIG. 18 is a top plan view of the PCB for the magnetic component of FIG. 17.
Figure 19:
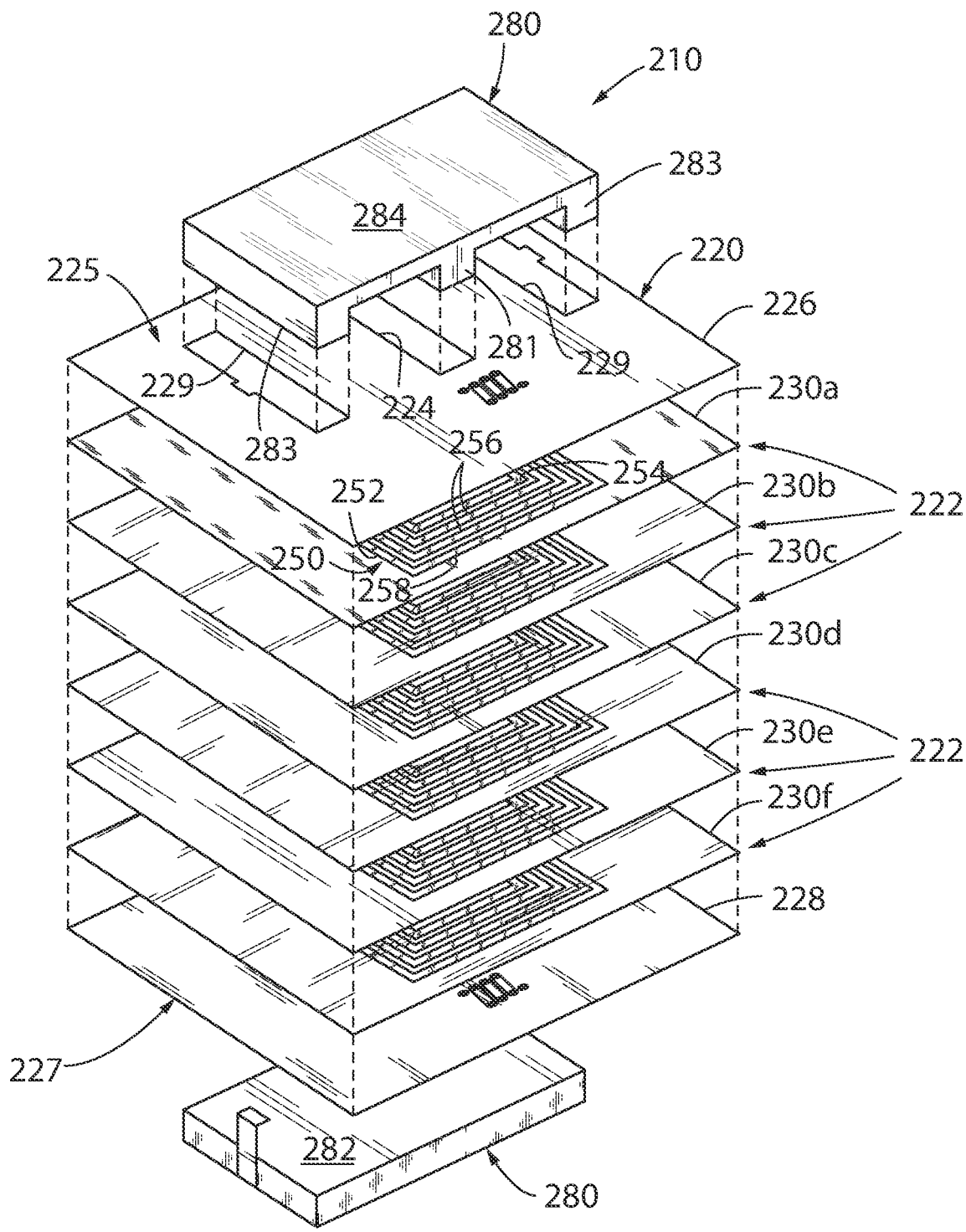
FIG. 19 is an exploded view of the PCB for the magnetic component of FIG. 17.

Turning next to FIGS. 17-19, one embodiment of an inductor, or set of inductors for a multi-phase voltage, integrated into a PCB for use in one or more of the filters discussed above is illustrated. Integrating the magnetic components into a PCB is discussed in detail in a co-pending application, which is also owned by Applicant, the co-pending application assigned U.S. Ser. No. 16/398,486 was filed Apr. 30, 2019 is titled System and Method for Reducing Power Losses for Magnetics Integrated in a Printed Circuit Board and is incorporated herein by reference in its entirety.

The magnetic component shown in FIGS. 17-19 includes a coil 250 integrated on a printed circuit board (PCB) 220 for use within the motor drive 20. The PCB includes multiple layers 230 and traces 252 on each layer are joined together to form a single coil 250 or to form multiple coils on the magnetic component. The PCB further includes at least one opening 224 in the PCB through which a core component 282 may pass. The traces 252 forming the coils may be laid out to encircle the opening and the core material, such that the magnetic component is defined by the coils and the core material. The dimensions of traces on a layer may be varied within the coil to reduce eddy currents within the traces resulting from air-gap fringing flux. The air-gap fringing flux is greatest proximate the opening in the PCB and at the air-gap in the core component. By making the width of individual traces that are closest to the opening within the coil narrower than traces that are further from the opening, the conductive material of the coil located within the region of high air-gap fringing flux is reduced. As a result, the eddy currents induced within the coil due to the air-gap fringing flux is reduced. Optionally, the position of traces between layers of the PCB are varied. The locations of individual traces are selected such that the trace is located in a region having a lower magnetic field component and, therefore, reducing coupling to leakage fluxes within the magnetic component. A floating conductive layer may also be positioned between the coil and the core material. The floating conductive layer may be a conductive sheet or series of traces located on one layer of the PCB and where the conductive layer is not connected to the coil. The conductive layer is preferably located near a surface of the PCB such that eddy currents and the resulting heat induced within the conductive layer are more readily dissipated out of the PCB.

With reference again to FIGS. 17-19, the PCB 220 is a multi-layer board where a coil 250 is defined by multiple loops of circuit traces 252 on the PCB. A first opening 224 extends through the PCB 220 which is configured to receive a center portion of a core 280. A pair of side openings 229 also extend through the PCB 220 with a first side opening 229 positioned to one side of the first opening 224 and a second side opening 229 positioned on the opposite side of the first opening 224. An "E-shaped" member 284 of the core 280 may be inserted into the openings with a central portion 281 of the core 280 extending through the first opening 224 and a pair of side members 283 of the core 280 extending through the side openings 229. A second member of the core, such as an "I-shaped" member 282 of the core 280 may be positioned on the reverse side of the PCB 220. Clips 227 extending up through the side openings 229 secure the two members of the core 280 together and positively retain the core 280 to the PCB 220. Optionally, an adhesive material may be applied between contacting surfaces of the "E-shaped" and "I-shaped" members to secure the core members together.

Figure 20:
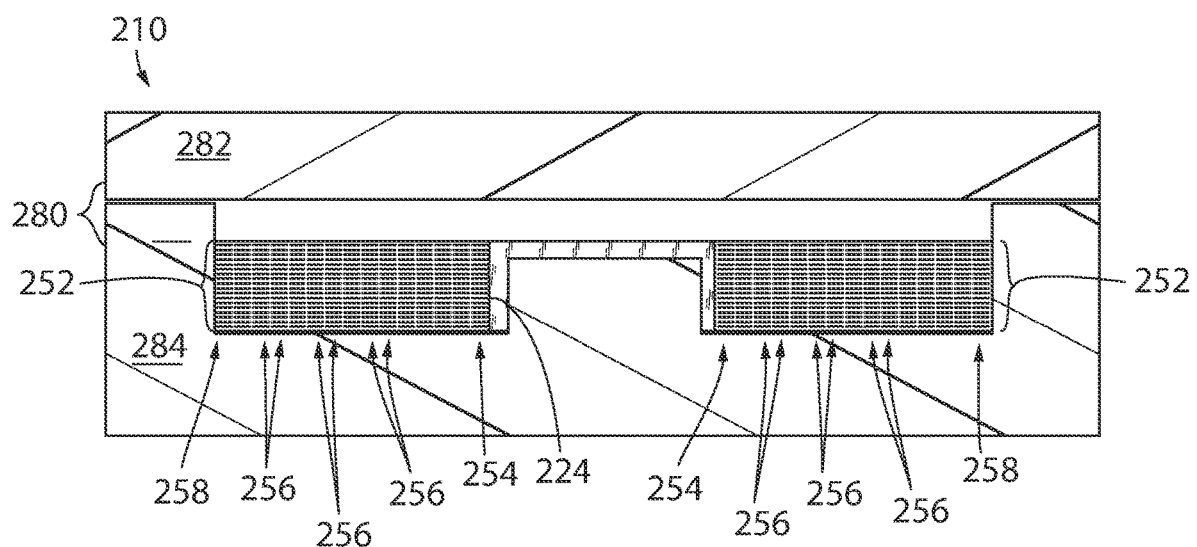
FIG. 20 is a sectional view of one embodiment of the PCB for the magnetic component of FIG. 17.

With reference also to FIG. 20, an exemplary sectional view of such an E-I core configuration is illustrated. The E-shaped member 284 is illustrated on the lower surface and the I-shaped member 282 is illustrated on the upper surface. It is understood that terms such as upper and lower, left and right, front and back, and the like are intended to be relational with respect to a figure and are not intended to be limiting. The illustrated magnetic component 210 may be rotated around a vertical axis, horizontal axis, or about any other axis of rotation for installation within a power converter and the associated components will similarly be rotated. It is further contemplated that various other configurations of the core 280 may be utilized. For example, other shapes including, but not limited to, U-shaped members, C-shaped members, R-shaped members, T-shaped members, D-shaped members, F-shaped members, and the like may be utilized according to the application requirements. Suitable openings may be cut through the PCB 220 and a suitable arrangement of traces 252 on each layer 230 of the PCB 220 may be implemented to complement the corresponding members of the core 280.

The circuit traces 252 are distributed on the PCB 220 such that they loop around the opening 224. Multiple loops may be formed on each layer 230 of the PCB 220 where an inner trace 254 is closest to the opening 224 and outer trace 258 is furthest from the opening 224. Various numbers of intermediate traces 256 may be defined between the inner trace 254 and the outer trace 258. Vias extending between layers of the PCB 220 may join coils on different layers to form a single coil spanning multiple layers 230. The illustrated embodiment illustrated in FIGS. 17-19 includes 4 loops on a layer for ease of illustration. It is contemplated that various other numbers of loops may be utilized according to the application requirements. Similarly, the illustrated embodiment includes eight layers on the PCB. A top layer 226 and a bottom layer 228 each include solder pads to which wires or other electrical conductors may be connected. Six intermediate layers 230a-230f are illustrated between the top and bottom layers, where each of the intermediate layers 230a-230f includes four loops. It is contemplated that the PCB 220 may include various other numbers of layers 230 according to the length of the traces and number of loops desired. The PCB 20 may include, for example, twenty layers or more. The number, length, and cross-section of the traces defining loops on a layer 230 and further the number of layers 230 on which loops are present define an inductance for the magnetic component. The layout and selection of the number of loops and number of layers, therefore, are selected according to the filtering requirements of the application in which the magnetic component is integrated.

Figure 21:
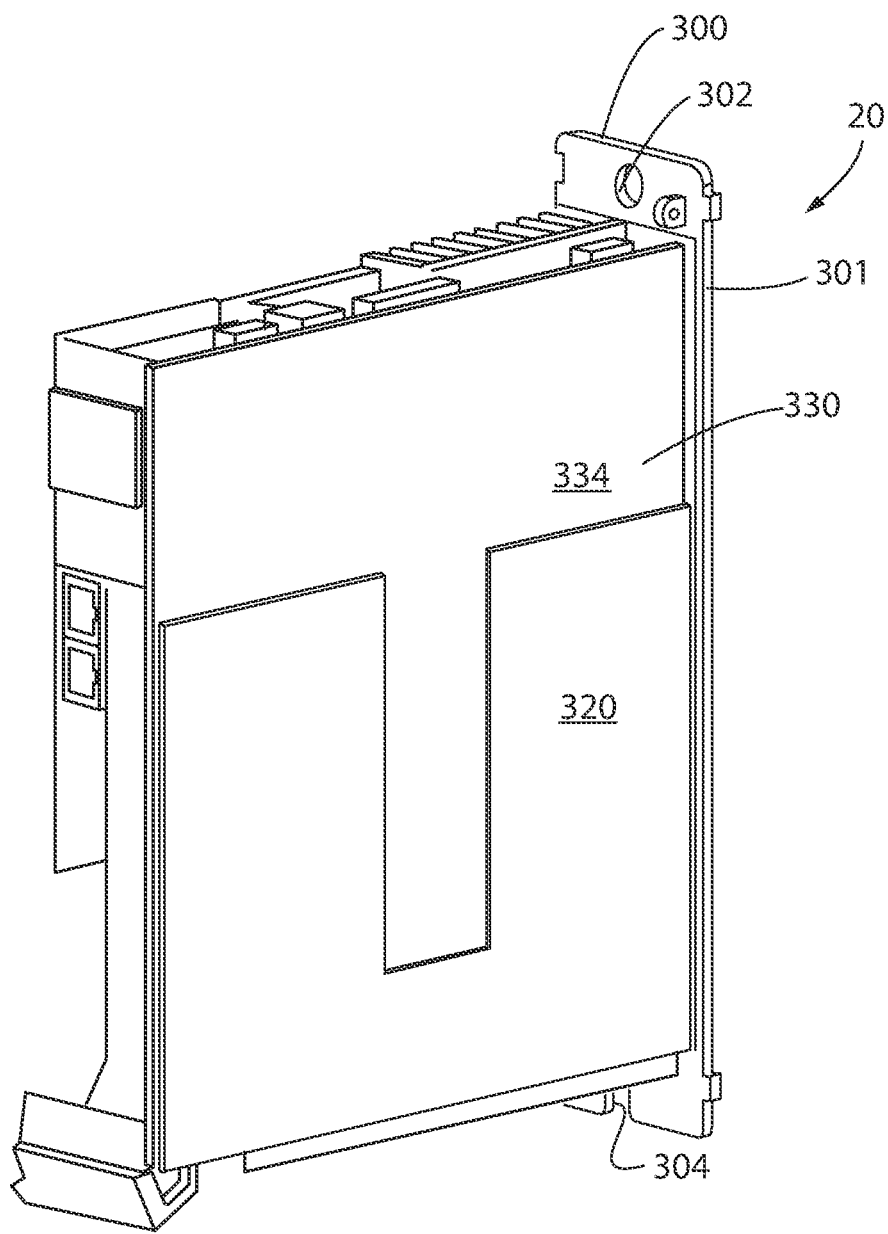
FIG. 21 is a perspective view of a motor drive with an EMI shield extending over a portion of the internal circuit board.
Figure 22:
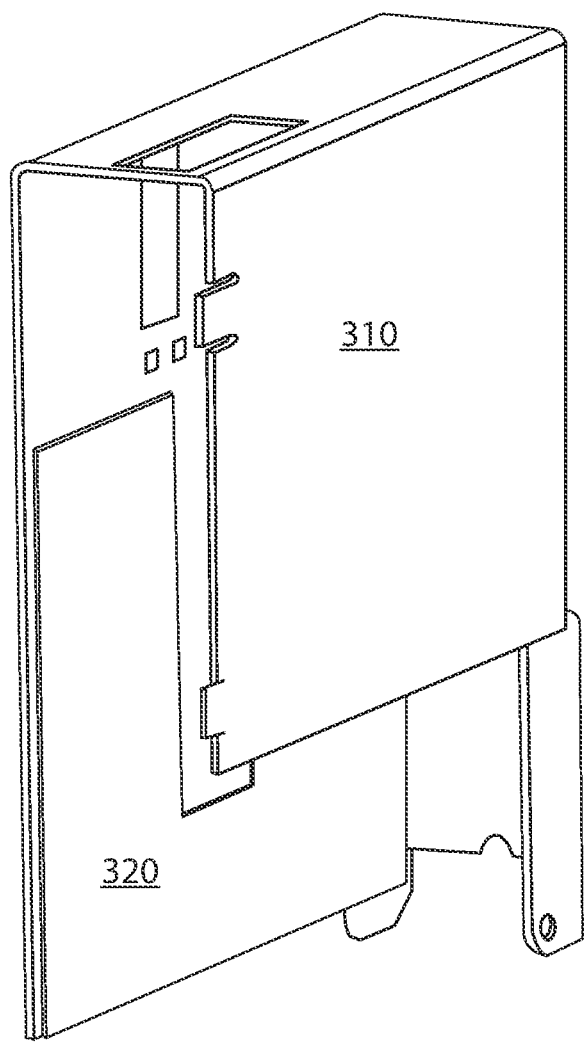
FIG. 22 is a perspective view of a housing for the motor drive of FIG. 21 with the EMI shield mounted to an interior surface of the housing.
Figure 23:
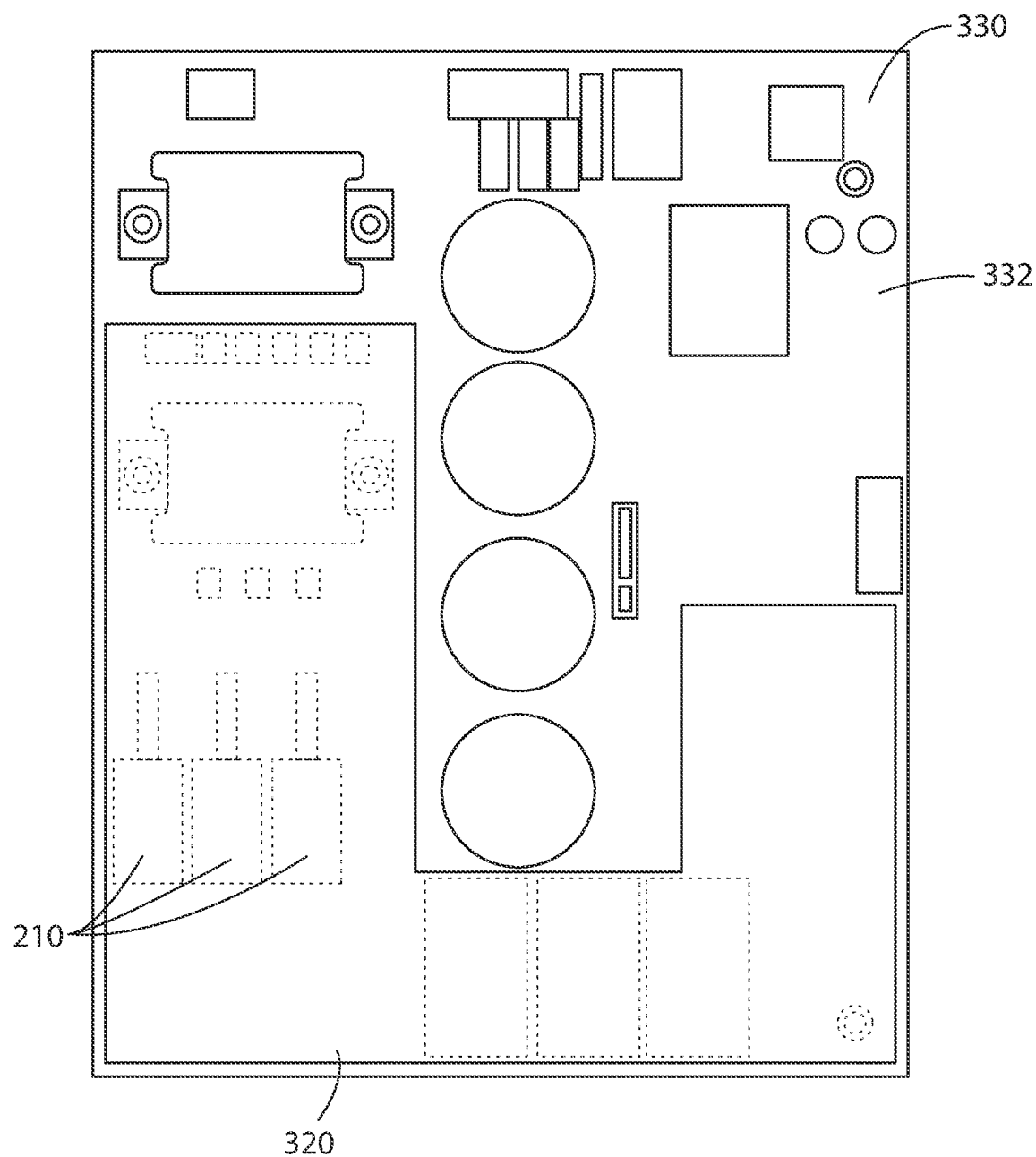
FIG. 23 is a top plan view of the internal circuit board with a block diagram representation of an EMI shield covering a portion of the circuit board.

Turning next to FIGS. 21-23, the motor drive 20 includes a radiated emissions shield 320. With reference first to FIG. 21, the motor drive 20 includes a chassis 300 configured to be mounted within a control cabinet. The chassis 300 includes a generally flat plate 301 to be mounted to a surface within the control cabinet. A mounting hole 302 near one end of the plate 301 and a mounting slot 304 near the other end of the plate are configured to receive a fastener, such as a screw, through the hole or slot to secure the chassis to the surface of the control cabinet. A primary PCB 330 within the motor drive 20 includes electronic components for operation of the motor drive 20 mounted thereto. The electronic components are mounted to a front surface 332 of the primary PCB 330 and face inwards to the motor drive 20, while a rear surface 334 of the primary PCB 330 faces outwards from the motor drive 20.

In FIG. 21, a first embodiment of a radiated emissions shield 320 is illustrated mounted to the rear surface 334 of the primary PCB 330. The radiated emissions shield 320 is a conductive surface which is operative to absorb radio frequency (RF) energy emitted from the PCB 330 creating eddy currents in the shield 320. The shield 320 is tied to a common connection, such as a ground connection, in order that currents induced in the shield are carried to the ground connection. The radiated emissions shield 320 may be, for example, a metal plate mounted by standoffs to the rear surface 334 of the primary PCB 330. Optionally, the radiated emissions shield 320 may be a conductive coating, where an insulative coating may first be applied to the rear surface 334 to prevent establishing conduction paths between traces, vias, and the like, and the conductive coating is then applied over the insulative coating to the rear surface 334 of the primary PCB 330.

In FIG. 22, a second embodiment of the radiated emissions shield 320 is illustrated mounted to an inside surface of a housing 310 for the motor drive 20. The housing 310 may mount over the chassis 300 shown in FIG. 21 and position the radiated emissions shield 320 with respect to the primary PCB 330. The shield 320 is tied to a common connection, such as a ground connection, in order that currents induced in the shield are carried to the ground connection. The radiated emissions shield 320 may be, for example, a metal plate mounted to the interior surface of the housing 310. Optionally, the radiated emissions shield 320 may be a conductive coating applied to surface.

Turning next to FIG. 23, the orientation of the radiated emission shield 320 with respect to the primary PCB 330 is illustrated. The radiated emissions shield 320 is shown covering at least a portion of the primary PCB 330. Electrical components located behind the shield 320 include, for example, the driver module 114, inverter section 100, seventh filter 120, eighth filter 130, located at the output of the motor drive 20 and, in which, high frequency current and/or voltage components may be present as a result of the operation of the inverter section 100. Although illustrated as covering only a portion of the primary PCB 330. It is contemplated that the shield 320 may take other shapes and cover, for example, the entire primary PCB 330. In some embodiments of the invention, it is also contemplated that the motor drive 20 may include a first and a second radiated emission shield, where a first shield 320 is located on one side of the primary PCB 330 and a second shield 320 is located on the other side of the primary PCB 330.

In operation, the motor drive 20 is configured to generate a sinusoidal output voltage waveform to control operation of a motor 10 connected to the motor drive. Switching devices in the inverter section 100 are selected which are suitable for high frequency switching. The switching device may be, for example, field-effect transistors (FETs) made of Silicon Carbide (SiC) MOSFET or Gallium Nitride (GaN FET) where the switching frequencies may increase to tens or hundreds of kilohertz (e.g., 20 kHz-1 MHz) in contrast to traditional IGBTs which are typically limited to upper switching frequencies in the range of 10 kHz-20 kHz. The greater the frequency at which the power switching devices are able to be modulated, the lower the amplitude of the harmonic content present on the output of the motor drive. Thus, including switching devices suitable for switching in the tens to hundreds of kilohertz range reduces the magnitude of the harmonic content that requires filtering and similarly reduces the amount of heat generated in the magnetic component as a result of the power being dissipated in that magnetic component.

Integration of a magnetic device, such as the inductors 122 in the seventh filter 120 at the output of the inverter section 100 in the motor drive 20 may attenuate or eliminate the harmonic content of the output voltage while allowing the desired fundamental component to be provided at the output 160 to the motor 10. Each inductor 122 may be implemented as one of the magnetic components 210 illustrated in FIGS. 17-20. Implementing the inductor windings as traces 254 on the PCB 220 and providing the magnetic cores 280 as shown allow three magnetic components 210 to be positioned next to each other in a stacked fashion (as shown in FIG. 23), reducing the surface are required on the primary PCB 330.

As previously indicated, connecting multiple filters to the common connection 15 allows common mode currents 180 to circulate within the motor drive 20. As illustrated in FIGS. 2-14, various conduction paths exist for the common mode currents to circulate from the output filter(s), through the common connection 15 to the input filter(s). Additionally, in some embodiments, multiple conduction paths exist between the input filter(s), output filter(s), and/or an intermediate filter(s), where the input filter is located before the converter section 40, the intermediate filter is located between the converter section 40 and the inverter section 120, and the output filter is located after inverter section. Circulation of the common mode currents within the motor drive 20 eliminates the requirement of an external overall shield conductor surrounding the other conductors within the output cable 14.

Providing a sinusoidal output voltage waveform and eliminating the conducted emissions at the output 160 of the motor drive 20 provides several advantages to the motor 10 and motor drive 20 system. Electromagnetic noise seen on the motor cable 14 is significantly reduced or eliminated. As is understood in the art, the electromagnetic noise may introduce ripple currents at the output 160 of the motor drive at the switching frequency or harmonics thereof. In traditional motor drives, these ripple currents may generate excessive acoustic noise or cause reflected waveforms on the motor cables 14 thereby limiting the length of the cables 14. Certain applications may impose cable length restrictions, for example, of ten to fifty meters (10-50 m). Additionally, the motor cables 14 are typically shielded cables requiring a shield conductor and/or a braided shield extending the length of the cable and secure connections to ground at the end of the cable 14. By providing a sinusoidal output voltage and causing the reduced magnitude common mode currents to circulate within the motor drive 20, the shielding requirements on the motor cables 14 may be eliminated. Similarly, the maximum cable length restrictions resulting from harmonic content may be removed. Cable length restrictions due solely to the voltages output at the fundamental frequency extend to miles of cable length. Further, the elimination of the current ripple, in turn, eliminates torque ripple at the motor 10 resulting from the current ripple. A purely sinusoidal output voltage as opposed to a modulated output voltage reduces stress on motor insulation and motor bearings as well, increasing the life of the motor 10 connected to the motor drive 20.

FIGS. 1-14, as discussed above, discuss a first embodiment of a motor drive topology that provides an improved sinewave output voltage waveform and its associated benefit to motor operation. The disclosed motor drive topology also provides improvements resulting from integrated differential mode and common mode filtering EMC filtering and radiated emission shielding for a single motor drive system. It is contemplated that the disclosed motor drive topology may be connected to a common AC bus utility line and a separate motor drive 20 may be provided to control each motor 10 in the system.

Figure 25:
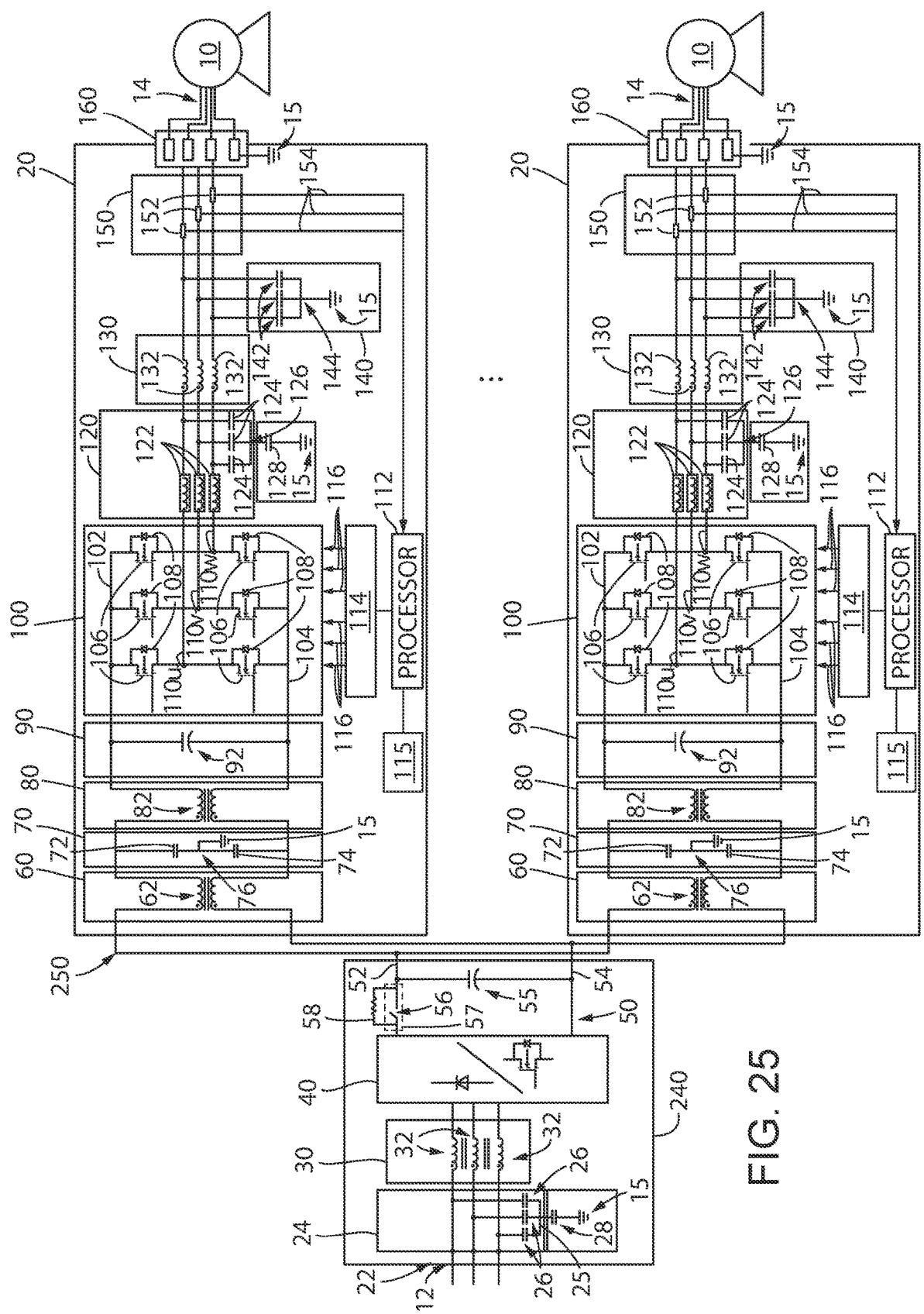
FIG. 25 is a schematic representation of a distributed motor drive system with integrated EMC filtering configured to provide a sinusoidal voltage output from each inverter according to another embodiment of the invention.
Figure 26:
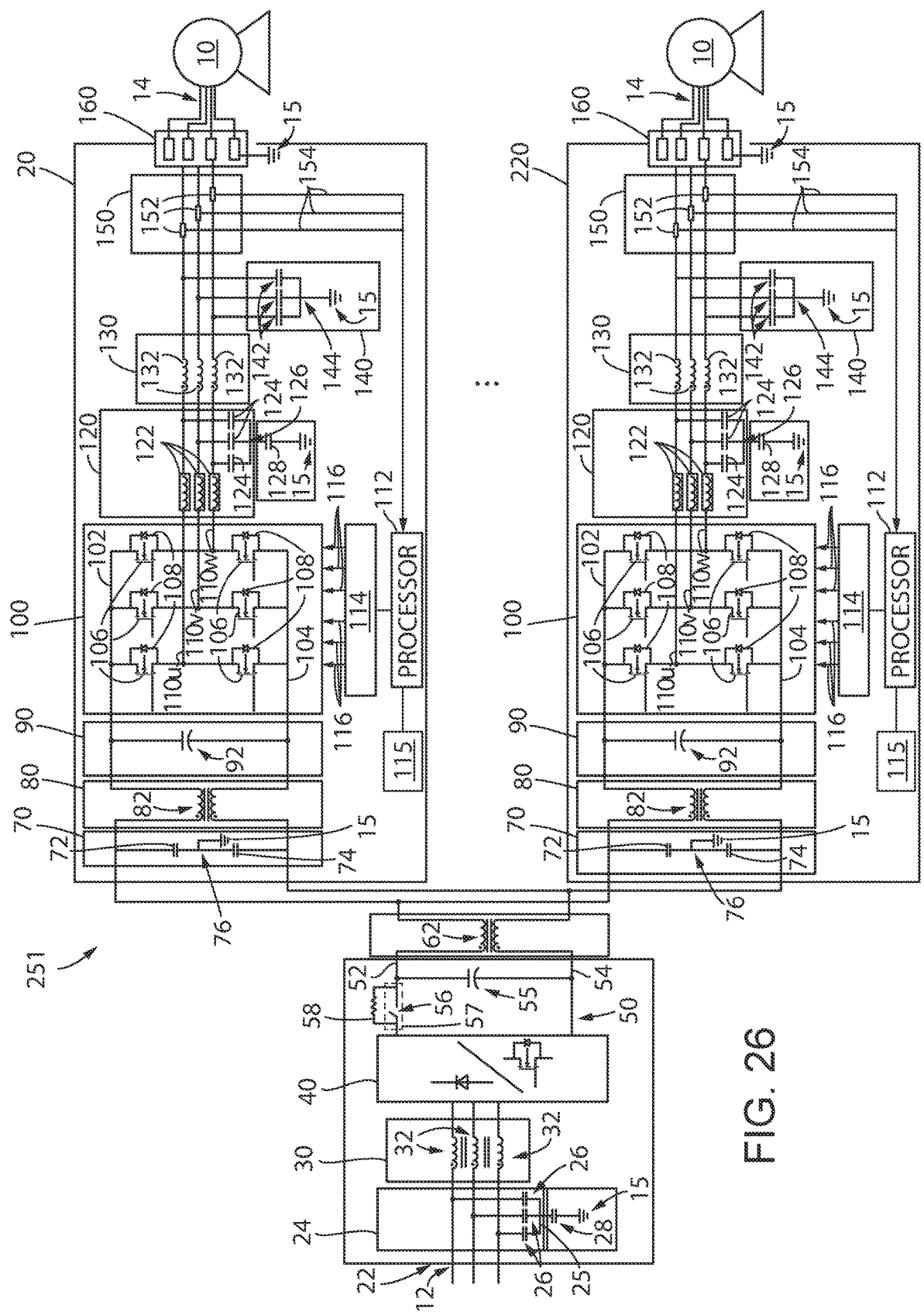
FIG. 26 is a schematic representation of another distributed motor drive system with integrated EMC filtering configured to provide a sinusoidal voltage output from each inverter according to another embodiment of the invention.

However, many controlled machines and processes find it advantageous to utilize a distributed motor drive topology. In a distributed motor drive topology, individual inverter sections are connected to a common dc bus. In a common dc bus system, when a first motor, also referred to as an axis, is motoring in steady state and a second axis is decelerating, generating excess regenerative energy which is supplied back onto the dc bus, the first axis can utilize that energy. This topology eliminates the need for DC brake resistor circuits for every axis to dissipate regenerative energy, resulting in reduction of energy cost, material cost, system size, and system weight. Further, certain applications, such as a roll wind—rewind configuration, operate one axis continuously in a motoring mode and another axis continuously in a regenerative mode. The connection to the AC utility can be smaller since it only needs to be rated to supply system energy losses, reducing cost of energy supplied by the AC utility. FIG. 25 and FIG. 26 show two possible embodiments with a common dc bus and distributed inverter section configuration.

Turning first to FIG. 25, one embodiment for a Common DC bus topology is illustrated with two axes, or motors 10, controlled by distributed motor drives 220. Each distributed motor drive 220 is connected, via a common DC bus 250 to a single rectifier module 240. However, it is contemplated that various numbers of axes may connected to the common DC bus 250 without deviating from the scope of the invention. Each distributed motor drive 220 includes a portion of the blocks discussed above with respect to FIGS. 1-14 to provide an improved sinusoidal output voltage waveshape at each set of output terminals 160 for each motor 10. Each distributed motor drive 220 further includes an integrated radiated shield protection over the high frequency inverter section 150 on the PCB, as discussed previously. Each distributed motor drive 220 illustrated in FIG. 25 includes the third filter 60, the fourth filter 70, the fifth filter 80, and the sixth filter 90 connected in series between the common DC bus 250 and the inverter section 100. The processor 112 and driver circuit 114 control operation of the inverter section 100 as discussed above. The seventh filter 120, eighth filter 130, and ninth filter 140 are connected in series between the output of the inverter section 100 and the current sensing segment 150 of the distributed motor drive 220. The fourth filter 70 and the sixth filter operate to provide significant reduction in differential mode noise voltage within each distributed motor drive 220. The fourth, fifth, and seventh through ninth filters attenuate and capture a majority of common mode noise current emissions within each axis. Common mode chokes, such as the inductors 132 in the eighth filter 130, attenuate the magnitude of the common mode current, and capacitors connected to the common connection point 15 within the distributed motor drive 220 circulate and contain a significant portion of the remaining common mode current within each axis. The embodiment illustrated in FIG. 25 includes a third filter 60 within each distributed motor drive 220. The DC common mode choke 62 in each filter reduces any remaining common mode current flowing from the axis onto the shared DC bus 250 and prevents common currents from one axis interacting with another axis.

The rectifier module 240 receives an AC voltage 12 at an input 22 to the module. According to the illustrated embodiment, the AC voltage 12 is a three-phase AC input voltage. The rectifier module 240 illustrated in FIG. 25 includes the first filter 24 and the second filter 30 connected in series between the input 22 and the converter section 40 of the rectifier module 240. The converter section 40 may be a passive converter section 40A or an active converter section 40B as discussed above. The DC bus charge circuit 57 is connected at an output of the converter section 40 and between the converter section and the DC bus capacitor 55. The DC bus 50 from the rectifier module 240 is then connected to the common DC bus 250 at an output of the rectifier module 240. The common Dc bus 250 is, in turn, configured to supply DC voltage to each of the distributed motor drive 220.

Turning next to FIG. 26, another embodiment for a common DC bus topology is illustrated. This embodiment is configured in much the same manner as FIG. 25 except the third filter 60 and the corresponding DC common mode choke 62 is connected in the rectifier module 240 rather than being repeated in each distributed motor drive 200. This embodiment may desirable if there is no appreciable interaction of common mode current circulating between different axis. It may further be desirable in an application in which one axis is configured to supply energy generated in a regenerative operating mode to the common DC bus 250 and another axis is configured to draw this regenerative energy from the common DC bus 250 for operation in a motoring mode. Although only two embodiments of a common DC bus topology are illustrated, it is further contemplated that various other arrangements of the system illustrated in FIGS. 2-14 may be employed in a common bus topology.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A motor drive, comprising:
a DC bus having a positive rail and a negative rail, the DC bus operative to maintain a DC voltage between the positive and negative rails;
a DC bus capacitance connected between the positive rail and the negative rail of the DC bus, wherein the DC bus capacitance includes:
a first DC bus capacitor connected at a first terminal to the positive rail and connected at a second terminal to a common connection; and
a second DC bus capacitor connected at a first terminal to the negative rail and connected at a second terminal to the common connection;
an inverter section having an input configured to receive the DC voltage from the DC bus and an output configured to output an AC output voltage wherein the inverter section is operative to covert the DC voltage to the AC output voltage;
an output configured to supply the AC output voltage to a motor operatively connected to the motor drive; and
an output filter operatively connected between the output of the inverter section and the output of the motor drive, wherein the output filter is connected to the common connection and wherein common mode currents present in the motor drive circulate within the motor drive via the common connection between the output filter and the DC bus capacitance.

2. The motor drive of claim 1 wherein:
the AC output voltage is a multi-phase AC output voltage;
the output filter further comprises:
a plurality of inductors wherein each inductor is connected in series with one phase of the multi-phase AC output voltage, and
a plurality of first capacitors, wherein each first capacitor is connected between one phase of the multi-phase AC output voltage and a first filter common connection point.

3. The motor drive of claim 2 further comprising a first common mode capacitor connected between the first filter common connection point and the common connection.

4. The motor drive of claim 3 further comprising:
an input configured to receive an AC input voltage;
a converter section having an input configured to receive the AC input voltage and an output configured to output the DC voltage to the DC bus wherein the converter section is operative to convert the AC input voltage to the DC voltage; and
an input filter operatively connected between the input of the motor drive and the input of the converter section, wherein:
the input filter is connected to the common connection,
the common mode currents present in the motor drive circulate within the motor drive, in part, via the common connection between the output filter and the DC bus capacitance, and
the common mode currents present in the motor drive circulate within the motor drive, in part, via the common connection between the output filter and the input filter.

5. The motor drive of claim 4 wherein:
the AC input voltage is a multi-phase AC input voltage,
the input filter further comprises a plurality of second capacitors, and
each second capacitor is connected between one phase of the multi-phase AC input voltage and a second filter common connection point.

6. The motor drive of claim 5 further comprising a second common mode capacitor connected between the second filter common connection point and the common connection.

7. The motor drive of claim 6 further comprising a first DC common mode inductor connected in series on the DC bus between the DC bus capacitance and the inverter section.

8. The motor drive of claim 7 further comprising a second DC common mode inductor connected in series on the DC bus between the converter section and the DC bus capacitance.

9. The motor drive of claim 8 further comprising an AC common mode inductor connected in series on each phase of the multi-phase AC input voltage between the input filter and the converter section.

10. The motor drive of claim 4 further comprising a radiated emissions shield, wherein the radiated emissions shield extends over the input filter, the inverter section, and the output filter.

11. A method of providing a sinusoidal output voltage from a motor drive, the method comprising the steps of:
converting a DC voltage present on a DC bus to an AC output voltage with an inverter section of the motor drive, wherein:
the DC bus includes a DC bus capacitance connected between a positive rail and a negative rail of the DC bus,
the DC bus capacitance includes a first DC bus capacitor and a second DC bus capacitor,
the first DC bus capacitor is connected at a first terminal to the positive rail and connected at a second terminal to a common connection; and the second DC bus capacitor is connected at a first terminal to the negative rail and connected at a second terminal to the common connection;

filtering the AC output voltage within the motor drive with an output filter operatively connected between an output of the inverter section and an output of the motor drive, wherein the output filter is connected to the common connection; and circulating common mode currents within the motor drive via the common connection between the output filter and the DC bus capacitance.

12. The method of claim 11 wherein:

the AC output voltage is a multi-phase AC output voltage, and the output filter includes:
- a plurality of inductors wherein each inductor is connected in series with one phase of the multi-phase AC output voltage, and
- a plurality of first capacitors, wherein each first capacitor is connected between one phase of the multi-phase AC output voltage and a first filter common connection point.

13. The method of claim 12 wherein the output filter further includes a first common mode capacitor connected between the first filter common connection point and the common connection.

14. The method of claim 13 further comprising the steps of:

receiving an AC input voltage at an input of the motor drive;

converting the AC input voltage to the DC voltage on the DC bus with a converter section; and filtering the AC input voltage within the motor drive with an input filter operatively connected between the input of the motor drive and an input of the converter section, wherein the input filter is connected to the common connection;

circulating common mode currents within the motor drive, in part, via the common connection between the output filter and the DC bus capacitance; and circulating common mode currents within the motor drive, in part, via the common connection between the output filter and the input filter.

15. The method of claim 14, wherein:

the AC input voltage is a multi-phase AC input voltage, the input filter includes a plurality of second capacitors, and each second capacitor is connected between one phase of the multi-phase AC input voltage and a second filter common connection point.

16. The method of claim 15 wherein the input filter further includes a second common mode capacitor connected between the second filter common connection point and the common connection.

17. The method of claim 16 further comprising the step of providing a first DC common mode inductor connected in series on the DC bus between the DC bus capacitance and the inverter section.

18. The method of claim 17 further comprising the step of providing a second DC common mode inductor connected in series on the DC bus between the converter section and the DC bus capacitance.

19. The method of claim 18 further comprising the step of providing an AC common mode inductor connected in series on each phase of the multi-phase AC input voltage between the input filter and the converter section.

20. The method of claim 14 further comprising the step of filtering radiated emissions with a radiated emissions shield extending over the input filter, the inverter section, and the output filter.

* * * * *